(12) United States Patent
Park et al.

(10) Patent No.: US 10,797,748 B2
(45) Date of Patent: Oct. 6, 2020

(54) PAIRWISE CROSS CORRELATION SEQUENCES FOR NON-ORTHOGONAL MULTIPLE ACCESS WIRELESS COMMUNICATIONS

(71) Applicant: QUALCOMM Incorporated, San Diego, CA (US)

(72) Inventors: Seyong Park, San Diego, CA (US); Jing Lei, San Diego, CA (US); Renqiu Wang, San Diego, CA (US); Joseph Binamira Soriaga, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/279,953

(22) Filed: Feb. 19, 2019

(65) Prior Publication Data
US 2019/0260417 A1 Aug. 22, 2019

Related U.S. Application Data

(60) Provisional application No. 62/633,484, filed on Feb. 21, 2018.

(51) Int. Cl.
*H04B 1/7093* (2011.01)
*H04J 13/00* (2011.01)
(Continued)

(52) U.S. Cl.
CPC ......... *H04B 1/7093* (2013.01); *H04B 7/0639* (2013.01); *H04B 7/0854* (2013.01);
(Continued)

(58) Field of Classification Search
CPC .. H04B 1/7093; H04B 7/0639; H04B 7/0854; H04J 11/004; H04J 13/0062; H04J 13/16
(Continued)

(56) References Cited

U.S. PATENT DOCUMENTS

2006/0239232 A1* 10/2006 Papadimitriou ........ H04J 13/10
370/335
2014/0192767 A1   7/2014 Au et al.
(Continued)

OTHER PUBLICATIONS

International Search Report and Written Opinion—PCT/US2019/018732—ISA/EPO—dated Jun. 7, 2019.
(Continued)

*Primary Examiner* — Michael R Neff
(74) *Attorney, Agent, or Firm* — Holland & Hart LLP

(57) ABSTRACT

Methods, systems, and devices for wireless communications are described that support pairwise cross correlation sequences for non-orthogonal multiple access wireless communications. A user equipment (UE) may receive, from a base station, an indication of a spreading factor and a number of transmitters in a group of non-orthogonal multiple access (NOMA) transmitters configured for concurrent transmissions. The UE may determine, based on the spreading factor and the number of transmitters, a first spreading sequence of a set of spreading sequences from a first codebook, the first spreading sequence having a defined value for pairwise cross correlation with each spreading sequence of the plurality of spreading sequences. The first UE may identify data to be transmitted in an uplink transmission, apply the first spreading sequence to the data to be transmitted in the uplink transmission, and transmit the uplink transmission to the base station.

28 Claims, 19 Drawing Sheets

(51) Int. Cl.
*H04B 7/06* (2006.01)
*H04B 7/08* (2006.01)
*H04J 13/16* (2011.01)
*H04J 11/00* (2006.01)

(52) U.S. Cl.
CPC ......... *H04J 11/004* (2013.01); *H04J 13/0062* (2013.01); *H04J 13/16* (2013.01); *H04B 2001/70935* (2013.01)

(58) Field of Classification Search
USPC ......................................................... 375/152
See application file for complete search history.

(56) References Cited

U.S. PATENT DOCUMENTS

| | | | |
|---|---|---|---|
| 2017/0214442 A1 | 7/2017 | Chae et al. | |
| 2018/0184390 A1* | 6/2018 | Wu | H04W 4/70 |
| 2019/0140793 A1* | 5/2019 | Takeda | H04J 11/00 |
| 2019/0181993 A1* | 6/2019 | Lee | H04J 13/10 |

OTHER PUBLICATIONS

Qualcomm Incorporated: "Link and System Level Performance Evaluation for NOMA", 3GPP Draft; R1-1802859 Link and System Level Performance Evaluation for NOMA, 3rd Generation Partnership Project (3GPP), Mobile Competence Centre ; 650, Route Des Lucioles ; F-06921 Sophia-Antipolis C, vol. RAN WG1, No. Athens, Greece; Feb. 26, 2018-Mar. 2, 2018, Feb. 17, 2018 (Feb. 17, 2018), XP051398272, 11 Pages, Retrieved from the Internet: URL:http://www.3gpp.org/ftp/tsg%5Fran/WG1%5FRL1/TSGR1%5F92/Docs/ [retrieved on Feb. 17, 2018], p. 3.

Qualcomm Incorporated: "Procedures Related to NOMA", 3GPP Draft, R1-1802858 Procedures Related to NOMA, 3rd Generation Partnership Project (3GPP), Mobile Competence Centre; 650, Route Des Lucioles ; F-06921 Sophia-Antipolis Cedex ; France, vol. RAN WG1, No. Athens, Greece, Feb. 26, 2018-Mar. 2, 2018, Feb. 17, 2018 (Feb. 17, 2018), XP051398271; 5 Pages, Retrieved from the Internet: URL:http://www.3gpp.org/ftp/tsg%5Fran/WG1%5FRL1/TSGR1%5F92/Docs/ [retrieved on Feb. 17, 2018], p. 2, paragraph 2.1.

Qualcomm Incorporated: "Receivers for NOMA", 3GPP Draft; R1-1802857 Receivers for NOMA, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 2, 2018, Feb. 17, 2018 (Feb. 17, 2018), XP051398270, 8 Pages, Retrieved from the Internet: URL:http://www.3gpp.org/ftp/tsg%5Fran/WG1%5FRL1/TSGR1%5F92/Docs/ [retrieved on Feb. 17, 2018], p. 2.

Qualcomm Incorporated: "RSMA and SCMA Comparison", 3GPP TSG-RAN WG1 #86, 3GPP Draft; R1-166358 RSMA and SCMA Comparison, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), pp. 1-11, XP051125349, Retrieved from the Internet: URL: http://www.3gpp.org/ftp/Meetings_3GPP_SYNC/RAN1/Docs/ [retrieved on Aug. 21, 2016] Figure 5.

Qualcomm Incorporated: "Transmitter Side Signal Processing Schemes for NOMA", 3GPP Draft; R1-1802856 Transmitter Side Signal Processing Schemes for NOMA, 3rd Generation Partnership Project (3GPP), Mobile Competence Centre, 650, Route Des , Lucioles, F-06921 Sophia-Antipolis Ced, vol. RAN WG1, No. Athens, Greece; Feb. 26, 2018-Mar. 2, 2018, Feb. 17, 2018 (Feb. 17, 2018), XP051398269, 9 Pages, Retrieved from the Internet: URL: http://www.3gpp.org/ftp/tsg_ran/WG1_RL1/TSGR1_92/Docs/ [retrieved on Feb. 17, 2018], Sections 2 and 3, p. 2, Paragraph 2.1—Paragraph 2.2.2.

* cited by examiner

PAIRWISE CROSS CORRELATION SEQUENCES FOR NON-ORTHOGONAL MULTIPLE ACCESS WIRELESS COMMUNICATIONS

CROSS REFERENCES

The present Application for Patent claims the benefit of U.S. Provisional Patent Application No. 62/633,484 by PARK, et al., entitled "Pairwise Cross Correlation Sequences For Non-Orthogonal Multiple Access Wireless Communications," filed Feb. 21, 2018, assigned to the assignee hereof, and expressly incorporated herein.

BACKGROUND

The following relates generally to wireless communication, and more specifically to pairwise cross correlation sequences for non-orthogonal multiple access wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, uplink communications from UEs to a base station may be orthogonal in one or more of the time, frequency, spatial, or code dimensions. However, ensuring orthogonality for a number of UEs may lead to inefficiencies in resource allocation. For example, an orthogonal codebook matrix supporting 'N' UEs may use spreading sequences of length 'N.' Since the number of UEs in communication with a base station may change dynamically, it may also be desirable to design codebook matrices to be forward compatible with changes in the number 'N' of UEs. Thus, improvements in resource efficiency for supporting uplink communication may be beneficial in wireless communications systems.

SUMMARY

The described techniques relate to improved methods, systems, devices, or apparatuses that support pairwise cross correlation sequences for non-orthogonal multiple access wireless communications. Generally, the described techniques provide for pairwise cross correlation spreading sequences that may be used to distinguish transmitters that transmit concurrently over common transmission resources using non-orthogonal multiple access (NOMA) techniques. In some cases, each spreading sequence in a spreading sequence codebook may have a defined value for pairwise cross correlation with each other spreading sequence in the spreading sequence codebook. In some cases, the spreading sequences in the codebook may achieve both a maximum Welch Bound Equality (WBE) (MWBE) and Root mean square (RMS) WBE.

In an example, a first user equipment (UE) may receive, from a base station, an indication of a spreading factor and a number of transmitters in a group of NOMA transmitters configured for concurrent transmissions. The first UE may determine, based at least in part on the spreading factor and the number of transmitters, a first spreading sequence of a set of spreading sequences from a first codebook, the first spreading sequence having a defined value for pairwise cross correlation with each spreading sequence of the plurality of spreading sequences. The first UE may identify data to be transmitted in an uplink transmission, apply the first spreading sequence to the data to be transmitted in the uplink transmission, and transmit the uplink transmission to the base station. A second UE may similarly generate an uplink transmission by applying a second spreading sequence of the set of spreading sequences from the first codebook, and concurrently transmit the uplink transmission to the base station using the same resources as used by the first UE to communicate its uplink transmission. The base station may receive at least two concurrent uplink transmissions from at least two transmitters (e.g., the first and second UEs) of the group of transmitters, and identify which transmitter of the group of transmitters transmitted each of the at least two concurrent uplink transmissions, based on the first spreading sequence and a second spreading sequence from the first codebook, that are respectively applied to the at least two concurrent NOMA transmissions.

A method of wireless communication by a transmitter, such as a UE, is described. The method may include receiving, from a base station, an indication of a spreading factor and a number of transmitters in a group of NOMA transmitters configured for concurrent transmissions, determining, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences, identifying data to be transmitted in an uplink transmission, applying the first spreading sequence to the data to be transmitted in the uplink transmission, and transmitting the uplink transmission to the base station.

An apparatus for wireless communication is described. The apparatus may include means for receiving, from a base station, an indication of a spreading factor and a number of transmitters in a group of NOMA transmitters configured for concurrent transmissions, means for determining, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences, means for identifying data to be transmitted in an uplink transmission, means for applying the first spreading sequence to the data to be transmitted in the uplink transmission, and means for transmitting the uplink transmission to the base station.

Another apparatus for wireless communication is described. The apparatus may include a processor, memory in electronic communication with the processor, and instructions stored in the memory. The instructions may be operable to cause the processor to receive, from a base station, an indication of a spreading factor and a number of transmitters in a group of NOMA transmitters configured for concurrent transmissions, determine, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences, identify data to be transmitted in an uplink transmission, apply the first spreading sequence to the data to be transmitted in the uplink transmission, and transmit the uplink transmission to the base station.

A non-transitory computer-readable medium for wireless communication is described. The non-transitory computer-readable medium may include instructions operable to cause a processor to receive, from a base station, an indication of a spreading factor and a number of transmitters in a group of NOMA transmitters configured for concurrent transmissions, determine, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences, identify data to be transmitted in an uplink transmission, apply the first spreading sequence to the data to be transmitted in the uplink transmission, and transmit the uplink transmission to the base station.

In some examples of the method, apparatus, and non-transitory computer-readable medium described above, determining the first spreading sequence further includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook.

In some examples of the method, apparatus, and non-transitory computer-readable medium described above, the spreading sequence matrix may be a fast Fourier transform matrix.

Some examples of the method, apparatus, and non-transitory computer-readable medium described above may further include processes, features, means, or instructions for identifying a plurality of codebooks that each include a plurality of spreading sequences, the plurality of codebooks including the first codebook. Some examples of the method, apparatus, and non-transitory computer-readable medium described above may further include processes, features, means, or instructions for selecting the first codebook from the plurality of codebooks based at least in part on the indication including a first index value associated with the spreading factor and a second index value associated with the number of transmitters in the group of NOMA transmitters.

In some examples of the method, apparatus, and non-transitory computer-readable medium described above, a plurality of spreading sequences of a second codebook of the plurality of codebooks may be generated as a function of a total squared sum of cross correlation for spreading sequence pairs from the plurality of spreading sequences of the second codebook.

Some examples of the method, apparatus, and non-transitory computer-readable medium described above may further include processes, features, means, or instructions for channel coding the data to be transmitted to generate channel coded data. Some examples of the method, apparatus, and non-transitory computer-readable medium described above may further include processes, features, means, or instructions for modulating the channel coded data to generate a series of modulation symbols.

In some examples of the method, apparatus, and non-transitory computer-readable medium described above, the first spreading sequence may be applied to each modulation symbol of the series of modulation symbols.

Some examples of the method, apparatus, and non-transitory computer-readable medium described above may further include processes, features, means, or instructions for mapping the spread series of modulation symbols to resources allocated for the concurrent transmissions, where the resources include frequency resources, time resources, spatial resources, or any combination thereof.

In some examples of the method, apparatus, and non-transitory computer-readable medium described above, the number of transmitters corresponds to a number of resource spread multiple access (RSMA) layers.

In some examples of the method, apparatus, and non-transitory computer-readable medium described above, each spreading sequence of the plurality of spreading sequences may be a truncated Chu sequence.

In some examples of the method, apparatus, and non-transitory computer-readable medium described above, the defined value may be a constant cross correlation value.

In some examples of the method, apparatus, and non-transitory computer-readable medium described above, the indication may be received from the base station in a master information block (MIB), in a system information block (SIB), in remaining minimum system information (RMSI), or any combination thereof.

A method of wireless communication by a base station is described. The method may include identifying a group of transmitters configured for concurrent NOMA transmissions, transmitting, to the group of transmitters, an indication of a spreading factor for an uplink transmission and a number of transmitters in the group of transmitters, determining, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences, receiving at least two concurrent NOMA transmissions from at least two transmitters of the group of transmitters, and identifying which transmitter of the group of transmitters transmitted each of the at least two concurrent NOMA transmissions, based at least in part on the first spreading sequence and a second spreading sequence that are respectively applied to the at least two concurrent NOMA transmissions.

An apparatus for wireless communication is described. The apparatus may include means for identifying a group of transmitters configured for concurrent NOMA transmissions, means for transmitting, to the group of transmitters, an indication of a spreading factor for an uplink transmission and a number of transmitters in the group of transmitters, means for determining, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences, means for receiving at least two concurrent NOMA transmissions from at least two transmitters of the group of transmitters, and means for identifying which transmitter of the group of transmitters transmitted each of the at least two concurrent NOMA transmissions, based at least in part on the first spreading sequence and a second spreading sequence that are respectively applied to the at least two concurrent NOMA transmissions.

Another apparatus for wireless communication is described. The apparatus may include a processor, memory in electronic communication with the processor, and instructions stored in the memory. The instructions may be operable to cause the processor to identify a group of transmitters configured for concurrent NOMA transmissions, transmit, to the group of transmitters, an indication of a spreading factor for an uplink transmission and a number of transmitters in the group of transmitters, determine, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences, receive at least two concurrent NOMA transmissions from at least two transmitters of the group of transmitters, and identify which transmitter of the group of transmitters transmitted each of the at least two concurrent NOMA transmissions, based at least in part on the first spreading sequence and a second spreading sequence that are respectively applied to the at least two concurrent NOMA transmissions.

A non-transitory computer-readable medium for wireless communication is described. The non-transitory computer-readable medium may include instructions operable to cause a processor to identify a group of transmitters configured for concurrent NOMA transmissions, transmit, to the group of transmitters, an indication of a spreading factor for an uplink transmission and a number of transmitters in the group of transmitters, determine, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences, receive at least two concurrent NOMA transmissions from at least two transmitters of the group of transmitters, and identify which transmitter of the group of transmitters transmitted each of the at least two concurrent NOMA transmissions, based at least in part on the first spreading sequence and a second spreading sequence that are respectively applied to the at least two concurrent NOMA transmissions.

In some examples of the method, apparatus, and non-transitory computer-readable medium described above, determining the first codebook includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook.

In some examples of the method, apparatus, and non-transitory computer-readable medium described above, the spreading sequence matrix may be a fast Fourier transform matrix.

In some examples of the method, apparatus, and non-transitory computer-readable medium described above, determining the first codebook includes: identifying a plurality of codebooks that each include a plurality of spreading sequences, the plurality of codebooks including the first codebook. Some examples of the method, apparatus, and non-transitory computer-readable medium described above may further include processes, features, means, or instructions for selecting the first codebook of the plurality of codebooks based at least in part on a first index value associated with the spreading factor and a second index value associated with the number of transmitters in the group of transmitters.

In some examples of the method, apparatus, and non-transitory computer-readable medium described above, a plurality of spreading sequences of a second codebook of the plurality of codebooks may be generated as a function of a total squared sum of cross correlation for spreading sequence pairs from the plurality of spreading sequences of the second codebook.

In some examples of the method, apparatus, and non-transitory computer-readable medium described above, receiving the at least two concurrent NOMA transmissions further includes: demapping the at least two concurrent NOMA transmissions to generate a despreaded set of modulation symbols. Some examples of the method, apparatus, and non-transitory computer-readable medium described above may further include processes, features, means, or instructions for combining the despreaded set of modulation symbols based at least in part on the plurality of spreading sequences in the first codebook.

In some examples of the method, apparatus, and non-transitory computer-readable medium described above, receiving the at least two concurrent NOMA transmissions further includes: demodulating and decoding the despreaded set of modulation symbols.

Some examples of the method, apparatus, and non-transitory computer-readable medium described above may further include processes, features, means, or instructions for determining a spreading sequence applied to each spread set of modulation symbols. Some examples of the method, apparatus, and non-transitory computer-readable medium described above may further include processes, features, means, or instructions for identifying which transmitter of the group of transmitters transmitted each received transmission based at least in part on the determined spreading sequence.

In some examples of the method, apparatus, and non-transitory computer-readable medium described above, a configuration and size of the first codebook, and a spreading scheme may be transmitted in an MIB, in an SIB, in RMSI, in a payload of a group common physical downlink control channel (PDCCH) transmission, or any combination thereof.

In some examples of the method, apparatus, and non-transitory computer-readable medium described above, the number of transmitters corresponds to a number of RSMA layers.

In some examples of the method, apparatus, and non-transitory computer-readable medium described above, each spreading sequence in the plurality of spreading sequences may be a truncated Chu sequence.

In some examples of the method, apparatus, and non-transitory computer-readable medium described above, the defined value may be a constant cross correlation value.

DETAILED DESCRIPTION

Figure 1:
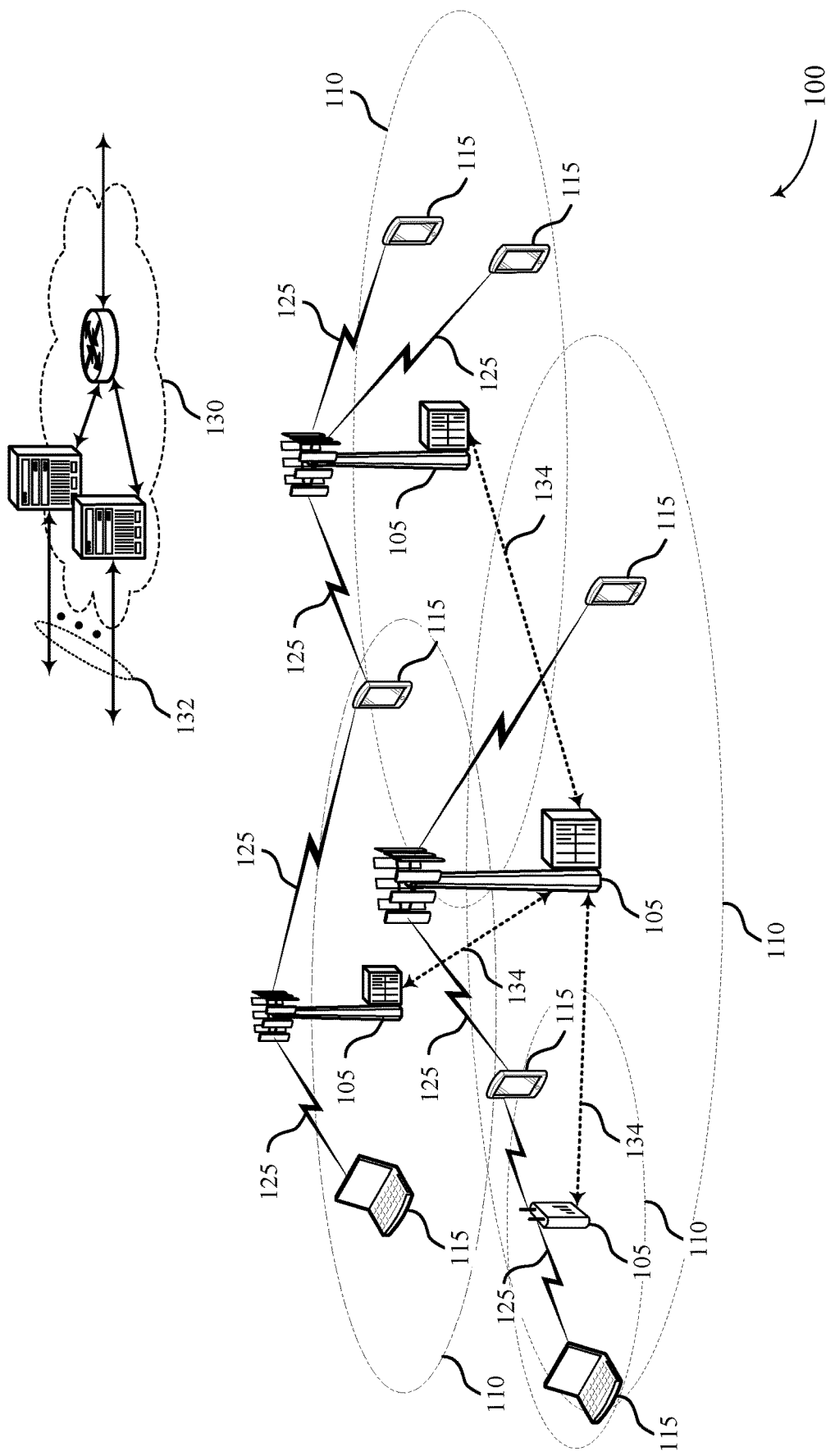
FIG. 1 illustrates an example of a system for wireless communication that supports pairwise cross correlation sequences for non-orthogonal multiple access wireless communications in accordance with aspects of the present disclosure.

The described techniques relate to improved methods, systems, devices, or apparatuses that support pairwise cross correlation sequences for non-orthogonal multiple access wireless communications. Generally, the described techniques provide pairwise cross correlation spreading sequences that may be used to distinguish transmitters that transmit concurrently over common transmission resources using non-orthogonal multiple access (NOMA) techniques. In some cases, each spreading sequence in a spreading sequence codebook may have a defined value for pairwise cross correlation with each other spreading sequence in the spreading sequence codebook. In some cases, the set of spreading sequences in a codebook may achieve both a maximum Welch Bound Equality (WBE) (MWBE) and Root Mean Square (RMS) WBE.

Some wireless communications systems may support multiple access techniques for multiple users by sharing available system resources (e.g., time, frequency, and power). In some cases, NOMA techniques may outperform orthogonal multiple access (OMA) techniques, and may allow multiple different transmitters to transmit concurrent transmissions. NOMA techniques may enable access to more system bandwidth for transmitting devices (e.g., a user equipment (UE)), while simultaneously enabling a greater number of users to communicate on a set of time frequency resources. As an example, using OMA techniques, a resource block (RB) may be allocated to three UEs such that, if each UE transmits using a single transmission antenna, three receive antennas may be used at a receiver (e.g., a base station), which may be representative of a 1×3 single-input, multiple-output (SIMO) transmission. By contrast, NOMA techniques may enable multiple UEs to concurrently transmit using the same RB resources.

NOMA techniques that enable the recovery of multiple simultaneous transmissions include, for example, successive interference cancelation (SIC), multi-user decoders (MUDs), resource spread multiple access (RSMA), or combinations thereof. A MUD may use SIC techniques to decode a first, relatively strong, signal from a first transmitter, subtract the first signal from the received signal, decode a second signal from a second transmitter, and so on. RSMA techniques may utilize lower rate channel coding that spreads a transmitted signal across resources. Gains obtained from the channel coding may lead to robust transmissions, and also may be well suited for sporadic transmissions of small non-orthogonal data bursts. For example, RSMA techniques may be beneficial in systems that support machine-type communication (MTC), enhanced MTC (eMTC), narrowband Internet of Things (NB-IoT) communications, and the like. In such cases, signals from multiple transmitting devices may be recovered simultaneously, even in the presence of mutual interference.

Through the use of NOMA techniques, greater scheduling flexibility may be provided for multiple access by a large number of UEs (e.g., for massive machine-type communications (mMTC) systems), while also supporting robust communications with varying channel code rates. Various of the NOMA techniques may use spreading sequences to spread transmissions and which may be used to identify a NOMA transmitter for a particular transmission.

A NOMA transmitter, such as a UE, may identify data to be transmitted in an uplink NOMA transmission, apply a spreading sequence from a codebook to the data, and transmit the spread data in the uplink NOMA transmission to the base station. The base station may receive multiple concurrent uplink NOMA transmissions from multiple UEs, perform receive signal processing (e.g., SIC, RSMA, etc.) to identify spread signals from each of the multiple UEs, despread the signals based on different spreading sequences to identify particular UEs that transmitted the despread signals, and demodulate and decode the despread signals.

In some examples, a spreading sequence may be selected for inclusion in a codebook that has a desired cross correlation property relative to other spreading sequences, and the codebook may include a set of spreading sequences that each have the desired cross correlation property. In some cases, a design goal for spreading sequences of a codebook may be to maximize a signal-to-interference ratio between different UEs, and the signal-to-interference ratio can be measured by cross-correlation where a smaller cross-correlation implies a larger signal-to-interference ratio.

In some cases, the spreading sequences from the codebook may be determined using a closed form expression in which a set of spreading sequences can be determined based on a spreading factor and an expected number of transmitters in the group of NOMA transmitters (e.g., a total number of UEs). In such cases, a base station may indicate to the UE a set of NOMA resources for an uplink transmission, the spreading factor, and the number of expected transmitters in the group of NOMA transmitters. The UE may identify the set of spreading sequences and select a spreading sequence from the identified set of spreading sequences to spread uplink data. In some cases, the spreading and resource mapping for spreading sequences may be performed in single or multiple domains, including the frequency domain, the time domain, the space domain (e.g., via different transmission beams), or any combination thereof.

In some cases, the defined desired cross correlation property for the set of spreading sequences in a codebook may be to have an equal cross correlation value with every other spreading sequence in the codebook. Various spreading sequences that are generated in accordance with techniques such as discussed herein may thus provide pseudo-random sequences having a constant, or substantially constant, peak-to-average-power ratio (PAPR) that can be used as a signature waveform of a UE. Such sequences may enhance the spectrum efficiency and the capacity of massive connectivity systems (e.g., mMTC systems) by advantageously being scalable based on the expected number of transmitters. Spreading sequences provided herein also simplify the implementation of receivers by providing a closed form expression in which each set of available spreading sequences can be determined based on two factors, namely the spreading factor and the expected number of transmitters in the group of NOMA transmitters. Furthermore, various design options for spreading sequence codebooks may achieve both an MWBE and RMS WBE for quasi-synchronous communications.

In an example, a first UE may receive, from a base station, an indication of a spreading factor and a number of transmitters in a group of NOMA transmitters configured for concurrent transmissions. The first UE may determine, based at least in part on the spreading factor and the number of transmitters, a first spreading sequence of a set of spreading sequences from a first codebook, the first spreading sequence having a defined value for pairwise cross correlation with each spreading sequence of the plurality of spreading sequences. The first UE may identify data to be transmitted in an uplink transmission, apply the first spreading sequence to the data to be transmitted in the uplink transmission, and transmit the uplink transmission to the base station. A second UE may similarly generate an uplink transmission by applying a second spreading sequence of the set of spreading sequences from the first codebook, and concurrently transmit the uplink transmission to the base station using the same resources as used by the first UE to communicate its uplink transmission. The base station may receive at least two concurrent uplink transmissions from at least two transmitters of the group of transmitters, and identify which transmitter of the group of transmitters transmitted each of the at least two concurrent uplink transmissions, based on first and second spreading sequences from the first codebook, that are respectively applied to the at least two concurrent NOMA transmissions.

Aspects of the disclosure are initially described in the context of a wireless communications system. The techniques may provide pairwise cross correlation spreading sequences that may be used to distinguish transmitters that transmit concurrently over common transmission resources using NOMA techniques. Aspects of the disclosure are further illustrated by and described with reference to apparatus diagrams, system diagrams, and flowcharts that relate to pairwise cross correlation sequences for non-orthogonal multiple access wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In an example, UE 115 may receive, from a base station 105, an indication of a spreading factor and an expected number of transmitters in a group of NOMA transmitters configured for concurrent transmissions (e.g., expected or total number of UEs 115). The UE 115 may determine, based at least in part on the spreading factor and the number of transmitters, a first spreading sequence of a set of spreading sequences from a first codebook, the first spreading sequence having a defined value for pairwise cross correlation with each spreading sequence of the set of spreading sequences. In some cases, a cross correlation value of the first spreading sequence with a second spreading sequence in the set may be equal to the cross correlation value with any other second spreading sequence in the set.

The UE 115 may identify data to be transmitted in an uplink transmission, apply the first spreading sequence to the data to be transmitted in the uplink transmission, and transmit the uplink transmission to the base station 105. A second UE 115 may similarly generate an uplink transmission by applying a second spreading sequence of the set of spreading sequences from the first codebook, and concurrently transmit the uplink transmission to the base station 105 using the same resources as used by the first UE 115 to communicate its uplink transmission. The base station 105 may receive at least two concurrent uplink transmissions from at least two transmitters of the group of transmitters, and identify which transmitter of the group of transmitters transmitted each of the at least two concurrent uplink transmissions, based on first and second spreading sequences from the first codebook, that are respectively applied to the at least two concurrent NOMA transmissions.

Figure 2:
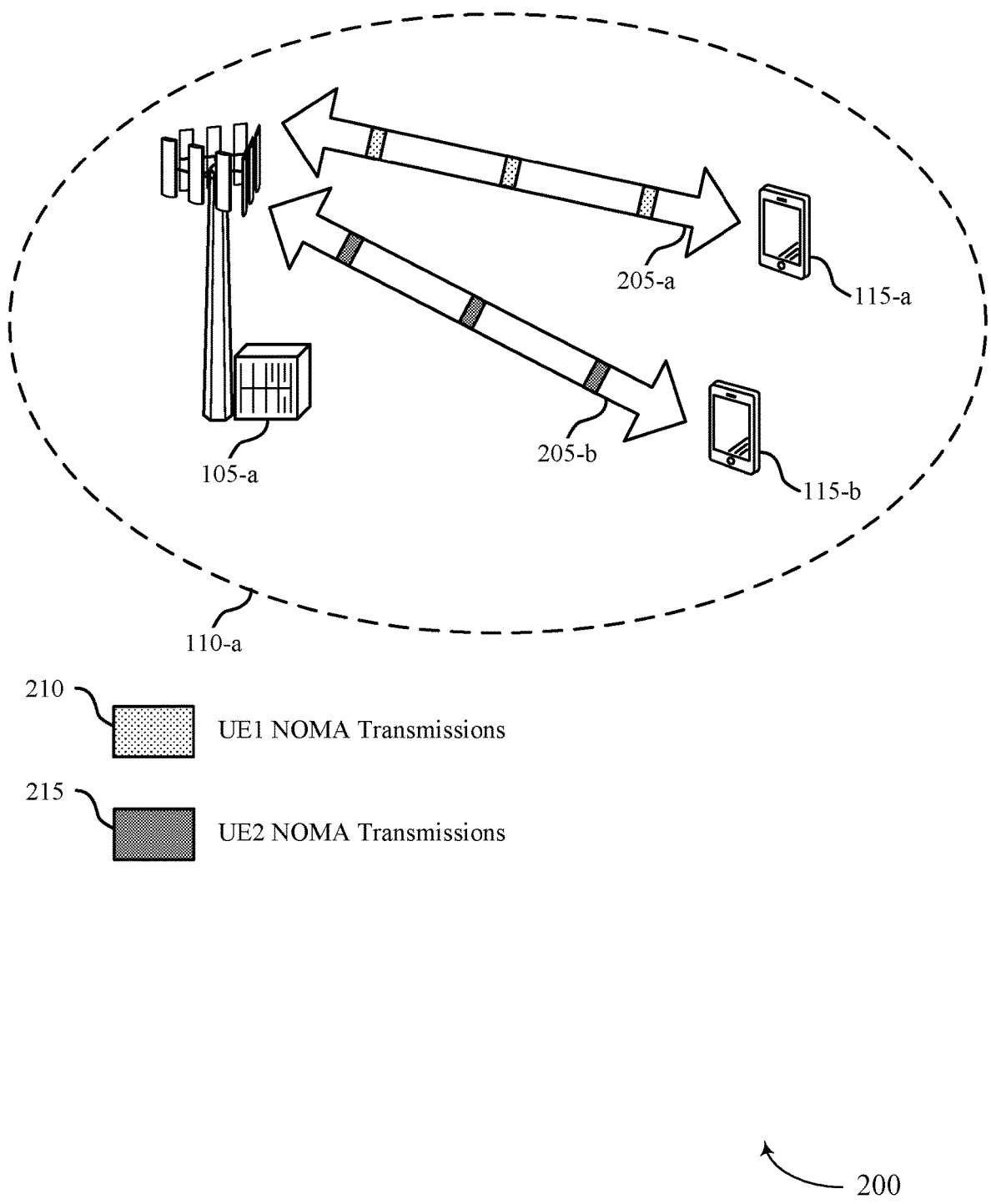
FIG. 2 illustrates an example of a wireless communications system that supports pairwise cross correlation sequences for non-orthogonal multiple access wireless communications in accordance with aspects of the present disclosure.

FIG. 2 illustrates an example of a wireless communications system 200 that supports pairwise cross correlation sequences for non-orthogonal multiple access wireless communications in accordance with various aspects of the present disclosure. In some examples, wireless communications system 200 may implement aspects of wireless communications system 100. In the example of FIG. 2, the wireless communications system 200 may include a base station 105-a, which may be an example of a base station 105 of FIG. 1. The wireless communications system 200 may also include a first UE 115-a and a second UE 115-b, which may be examples of a UE 115 of FIG. 1, that are located within coverage area 110-a of the base station 105-a.

In the example of FIG. 2, the base station 105-a and the first UE 115-a may establish a first connection 205-a and the base station 105-a and the second UE 115-b may establish a second connection 205-b. In some cases, each of the first UE 115-a and the second UE 115-b may concurrently transmit uplink transmissions via their respective connections 205 in accordance with NOMA techniques. That is, UE 115-a may transmit a UE1 NOMA transmission 210 concurrently to UE 115-b transmitting a UE2 NOMA transmission 215. As discussed above, NOMA techniques may help to enhance the achievable spectral efficiency (SE) of the wireless communications system 200. In some cases, the base station 105-a may include a SIC/MUD receiver that may receive and decode concurrently transmitted signals transmitted from the first UE 115-a and the second UE 115-b. In various aspects of the present disclosure, the UEs 115 may apply spreading sequences to uplink transmissions based on a codebook of available spreading sequences, as will be discussed in more detail in FIGS. 3 through 7.

Figure 3:
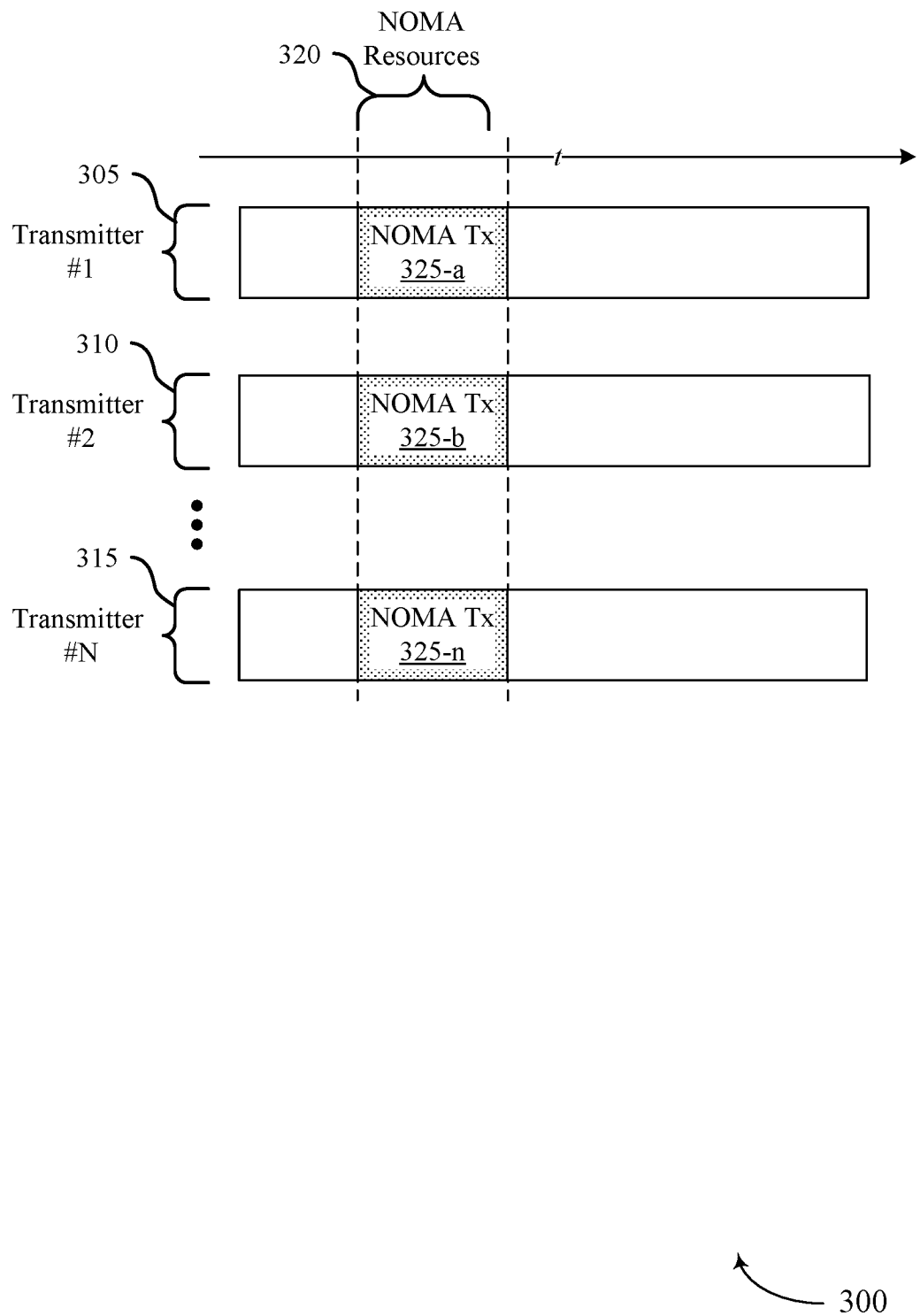
FIG. 3 illustrates an example of non-orthogonal multiple access resources that support pairwise cross correlation sequences for non-orthogonal multiple access wireless communications in accordance with aspects of the present disclosure.

FIG. 3 illustrates an example of non-orthogonal multiple access resources 300 that support pairwise cross correlation sequences for non-orthogonal multiple access wireless communications in accordance with various aspects of the present disclosure. In some examples, non-orthogonal multiple access resources 300 may be implemented in aspects of wireless communications system 100 or 200.

In the example of FIG. 3, a number of UEs may be partitioned into a number of transmitter groups that may be allocated common resources for concurrent NOMA transmissions 325. In this example, a first transmitter 305, a second transmitter 310, through an Nth transmitter 315 may be in a first transmitter group that is allocated NOMA resources 320. While allocated NOMA resources 320 are illustrated as common resources in the time domain, NOMA resources 320 may be allocated in the time domain, frequency domain, spatial domain (e.g., via different beamformed transmission beams), or any combination thereof. As indicated above, each transmitter 305-315 may transmit a NOMA transmission 325 using NOMA resources 320, and in this example the first transmitter 305 may transmit a first NOMA transmission 325-a, the second transmitter 310 may transmit a second NOMA transmission 325-b, and so on with the Nth transmitter 315 transmitting an Nth NOMA transmission 325-n.

Each of the NOMA transmissions 325 may have a spreading sequence applied thereto according to various techniques provided herein. In some cases, the spreading sequence applied to each NOMA transmission 325 may be selected from a spreading sequence codebook, which may also be referred to as a short spreading sequence codebook. In some cases, each of the spreading sequences provided in a codebook may be determined based on a closed-form expression in which each set of available spreading sequences can be determined based on two factors, namely a spreading factor, and the number of transmitters (N) that are expected to transmit using the common NOMA resources 320. Such a closed form expression may simplify the implementation of spreading sequences and be implemented with relatively low memory requirements.

In some cases, the spreading sequences may be derived from one of a number of expressions. For example, a codebook of spreading sequences may be defined as:

$$\Theta_{N \times K} \triangleq [S_1 S_2 \ldots S_N]^T$$

and within each codebook the $n^{th}$ spreading sequence may be defined as:

$$S_n \triangleq [S_n(1) S_n(2) \ldots S_n(K)]^T$$

in which N is the number of distinct sequences in the codebook of spreading sequences, and K is the length of the spreading sequences. In some cases, the length of the spreading sequences, K, may correspond to the number/configuration on the NOMA resources 320 (e.g., a number of OFDM symbols, a number of RBs, etc.), and the number of distinct sequences in the codebook, N, may correspond to the expected number of transmitters 305-315. The distinct spreading sequences within a codebook may be defined using a number of different options for closed form expressions. In some cases, each sequence may be defined by expression (1):

$$s_n(k) \triangleq \frac{1}{\sqrt{K}} \exp\left(\frac{j\pi(k+n+\theta)(k+n+1+\theta)}{N}\right);$$

$$1 \le k \le K, 1 \le n \le N, -N \le \theta < N$$

in which θ is a random integer, and k and n are indexes into the codebook. In other cases, each sequence may be defined by the expression (2):

$$s_n(k) \triangleq \frac{1}{\sqrt{K}} \exp\left(\frac{j\pi(k+n+\theta)^2}{N}\right);$$

$$1 \le k \le K, 1 \le n \le N, -N \le \theta < N.$$

Figure 5:
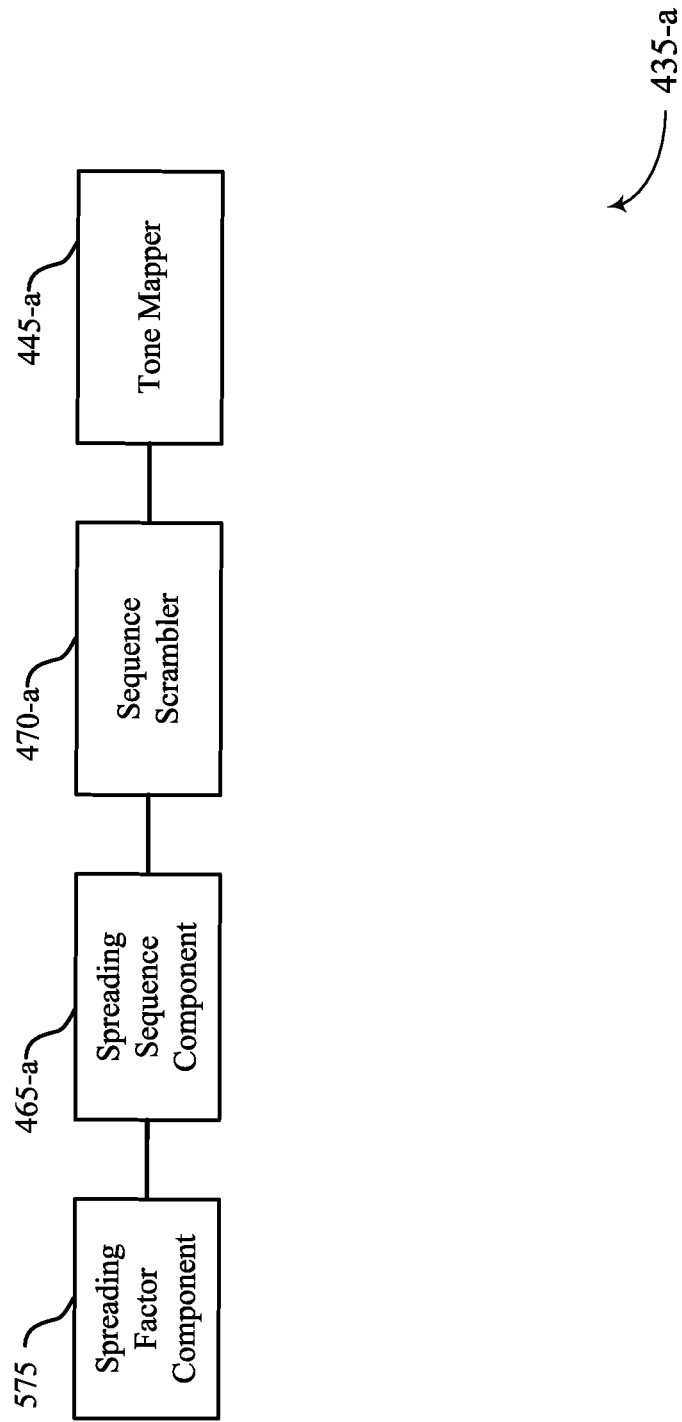
FIG. 5 illustrates an example of a spreading chain that supports pairwise cross correlation sequences for non-orthogonal multiple access wireless communications in accordance with aspects of the present disclosure.
Figure 6:
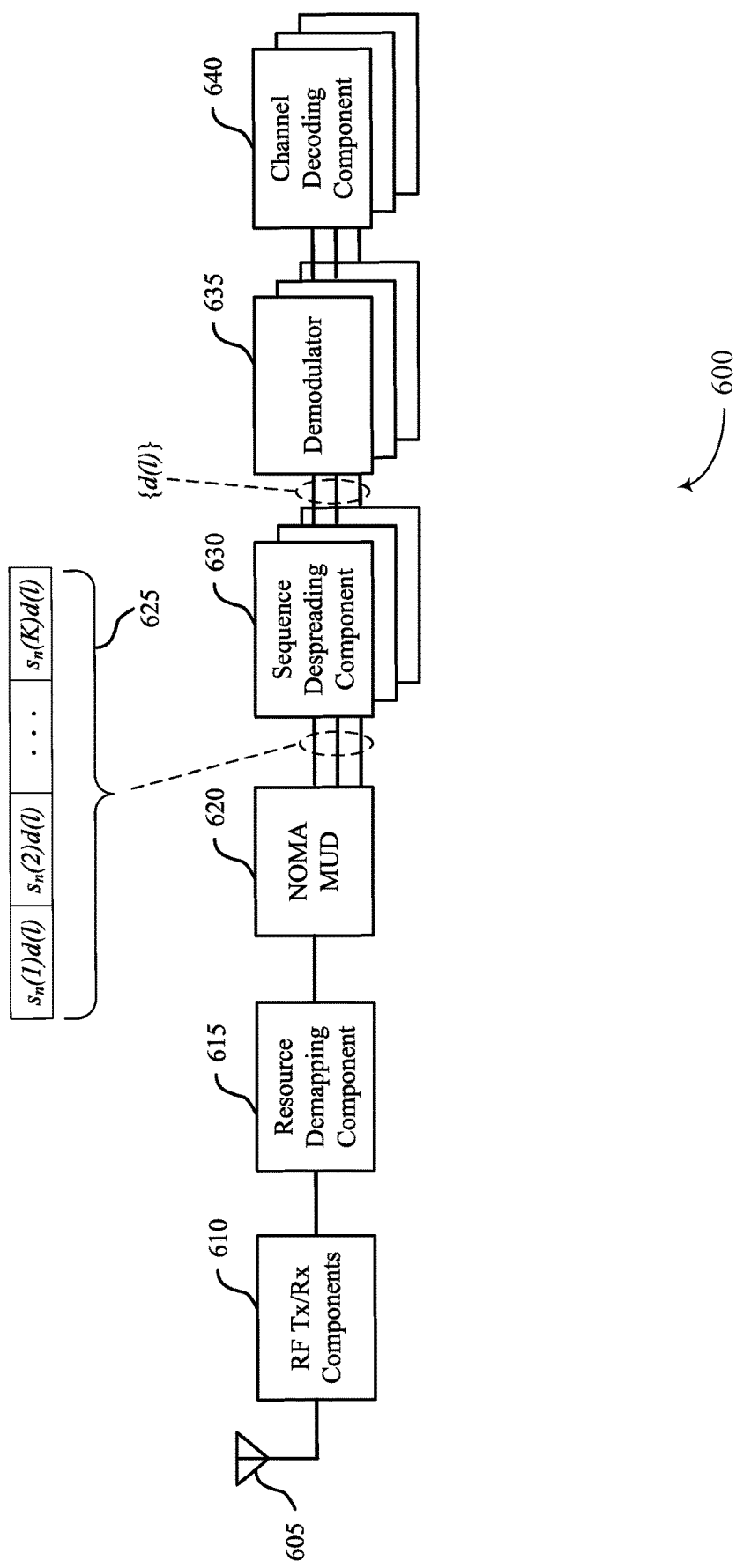
FIG. 6 illustrates an example of a receive chain that supports pairwise cross correlation sequences for non-orthogonal multiple access wireless communications in accordance with aspects of the present disclosure.

In other cases, expression (3) may be more scalable and defined as:

$$s_n(k) \triangleq$$

$$\begin{cases} \frac{1}{\sqrt{K}} \exp\left(\frac{j2\pi(k+n+\theta)(k+n+1+\theta)}{N}\right); 1 \le k \le K, 1 \le n \le \frac{N}{2}, -N \le \theta < N \\ \frac{1}{\sqrt{K}} \exp\left(\frac{j2\pi(k+n+\theta)^2}{N}\right); 1 \le k \le K, N/2 < n \le N, -N \le \theta < N \end{cases}$$

which may allow for more sequences to be present in the codebook. As indicated above, a transmitter may apply a particular spreading sequence to a transmission as part of a NOMA transmission 325, which may provide a spreading sequence for each transmitter. One example of application of a spreading sequence to a NOMA transmission is illustrated in FIGS. 4-5, and a corresponding example of receiving NOMA transmissions is illustrated in FIG. 6.

Figure 4:
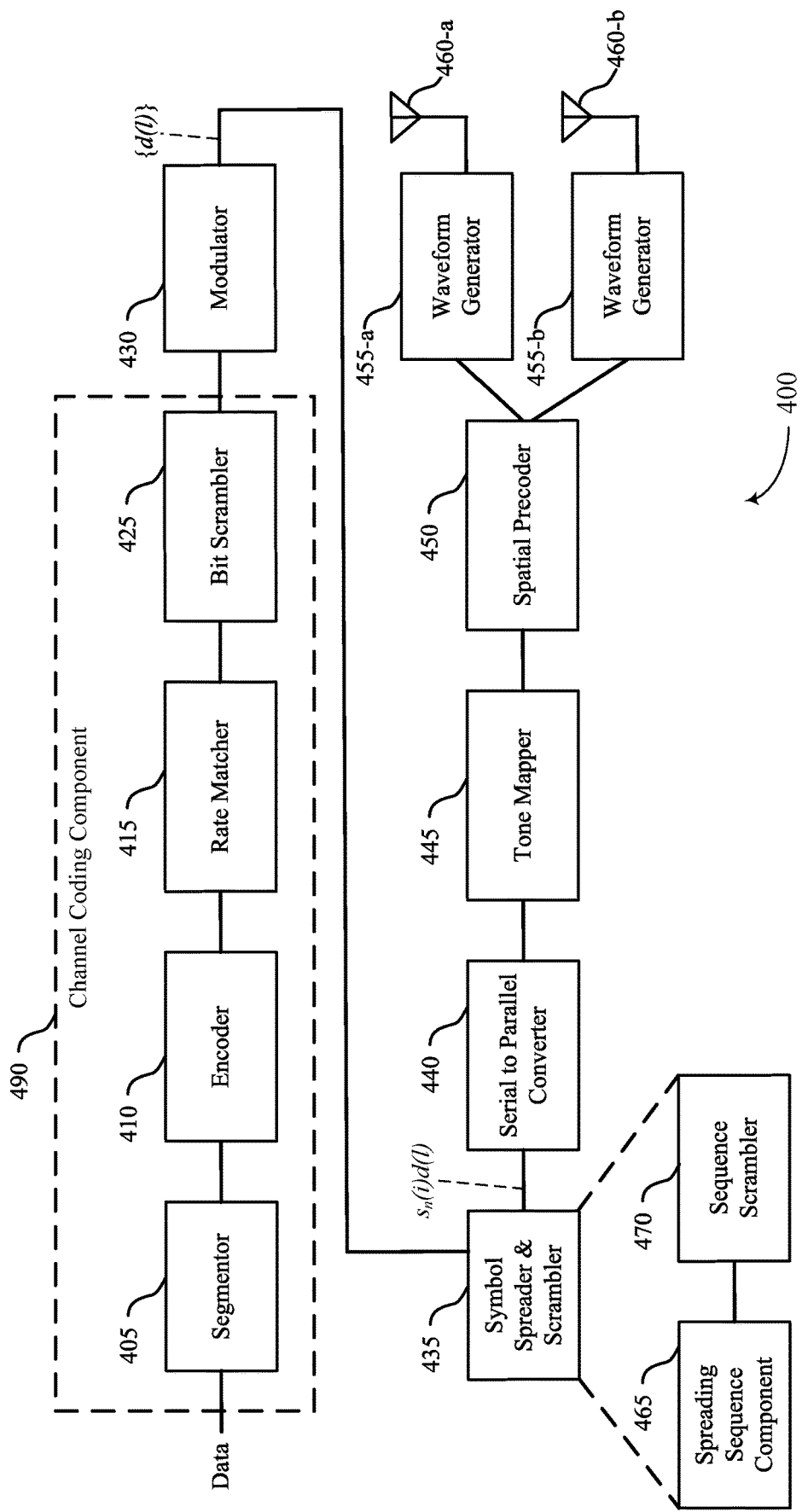
FIG. 4 illustrates an example of a transmit chain that supports pairwise cross correlation sequences for non-orthogonal multiple access wireless communications in accordance with aspects of the present disclosure.

FIG. 4 illustrates an example of a transmit chain 400 that supports pairwise cross correlation sequences for non-orthogonal multiple access wireless communications in accordance with various aspects of the present disclosure. In some examples, transmit chain 400 may implement aspects of wireless communications system 100 or 200. The transmit chain 400 may be implemented in a UE (e.g., a UE 115 of FIG. 1 or 2), although the concepts provided herein may be applied to any NOMA transmitter.

In an example, a UE 115 may identify uplink data to be transmitted and provide the data to a channel coding component 490, which may perform channel coding of the data into one or more transmit channels in accordance with a particular system in which the transmitter operates (e.g., an NR uplink data and/or control channel). The channel coding component 490 may include a segmentor 405, an encoder 410, a rate matcher 415, and a bit scrambler 425. The segmentor 405 may receive a bit stream of uplink data for transmission by the UE 115 in one or more uplink NOMA transmissions, segment bits of the bit stream into transport blocks (TBs), and generate an CRC on the bits of a respective transport block for inclusion as CRC bits in that transport block. A receiver, such as a base station 105, may use received CRC bits for determining whether an uplink transmission that includes a corresponding transport block was received successfully. The encoder 410 may apply a coding technique to the transport blocks such as, for example, a low-density parity-check (LDPC) encoding algorithm, to generate coded data bits. The rate matcher 415 may perform rate matching on the coded data bits. For example, rate matching may involve selecting which of the coded data bits to transmit, and which of the coded data bits to discard. The bit scrambler 425 may scramble the rate matched coded data bits with a scrambling sequence and output the scrambled and rate matched coded data bits as channel coded data. The scrambling sequence may be, for example, to a sequence applied for randomizing the rate matched coded data bits.

The channel coded data may be provided to a modulator 430 that may modulate the coded data according to a modulation and coding scheme (MCS) to generate a data symbol vector that is a sequence of modulation symbols $\{d(l)\}$. The data symbol vector may be provided to the symbol spreader and scrambler 435 which may apply a spreading sequence to the modulation symbols of the symbol vector in accordance with various techniques provided herein, to provide a spread data symbol vector $\{s_n(1)d(l), s_n(2)d(l), \ldots s_n(K)d(l)\}$ that is spread sequence of modulation symbols, where K is selected based on a spreading factor. The particular spreading sequence applied by the transmitter, identified as an index n into the codebook, may be selected by a UE (e.g., randomly selected) or assigned by a base station, in some examples. In an example, the symbol spreader and scrambler 435 may include a spreading sequence component 465 and optionally may include a sequence scrambler 470. In some cases (e.g., in a single stage spreading process), symbol spreader and scrambler 435 may apply a single spreading sequence and skip applying the scrambling sequence. In other cases (e.g., in a hybrid spreading process), symbol spreader and scrambler 435 may apply both a spreading sequence and a scrambling sequence to the data symbol vector (e.g., in turn). In some examples, the spreading sequence may be shorter in length than the scrambling sequence.

The spreading sequence component 465 may perform symbol spreading by applying a spreading sequence specific to UE 115 to the data symbol vector. The spreading sequence (e.g., a short code sequence) may vary from UE 115 to UE 115 and spreading sequences for some UEs may be non-orthogonal with respect to each other. The spreading sequence component 465 may output a spread data symbol vector to a serial to parallel (S/P) converter 440, or the spread data symbol vector may be considered an intermediate spread data symbol vector that is output to the sequence scrambler 470. If the symbol spreader and scrambler 435 includes the sequence scrambler 470, the sequence scrambler 470 may perform UE-specific scrambling using a scrambling sequence (e.g., a scrambling sequence that is longer than the spreading sequence) on the intermediate spread data symbol vector in order to generate a spread data symbol vector to pass to the S/P converter 440.

The S/P converter 440 may perform an S/P conversion of the spread data symbol vector to obtain parallel sets of time domain symbols of length M. This length M may correspond to the size of the set of frequency resources allocated to the UE for transmission of the data symbol vector. A tone mapper 445 may respectively map the parallel sets streams of time domain symbols to tones corresponding to one or more symbol periods within NOMA resources 320. A spatial precoder 450 may precode the parallel streams of spread modulation symbols in accordance with their tone mapping for transmission on respective layers corresponding to a rank of the uplink transmission, and output a set of frequency domain signals. One or more waveform generators 455-a, 455-b may perform an inverse fast Fourier transform (IFFT) process on the frequency domain signals to generate a time domain waveform (e.g., a NOMA CP/DFT-s-OFDM waveform) for uplink transmission. UE 115 may transmit this waveform via antennas 460-a, 460-b to a base station 105 using the frequency and time NOMA resources 320 identified for the uplink transmission of the uplink data by UE 115.

In some cases, the symbol spreader and scrambler 435 may include additional components. FIG. 5 illustrates an example of a symbol spreader and scrambler 435-a that supports pairwise cross correlation sequences for non-orthogonal multiple access wireless communications in accordance with various aspects of the present disclosure. In some examples, symbol spreader and scrambler 435-a may implement aspects of wireless communications system 100 or 200. The symbol spreader and scrambler 435-a is an example of the symbol spreader and scrambler 435 of FIG. 4.

The symbol spreader and scrambler 435-a may include a spreading factor component 575, a spreading sequence component 465-a, a sequence scrambler 470-a, and a tone mapper 445-a. The spreading factor component 575 may determine a spreading factor to be used for an uplink transmission (e.g., spreading factor={2, 4, 6, [8], 12 . . . }). The spreading factor component 575 may process, for example, an indication received from the base station 105-a that indicates which spreading factor of multiple spreading factors to use for an uplink transmission, and may generate a number of repetitions of the data symbols in the data symbol vector corresponding to the indicated spreading factor.

The spreading sequence component 465-a may determine a spreading sequence from a codebook that includes a set of spreading sequences (e.g., a set of short spreading codes) to apply to each repetition of the data symbol vector. The spreading sequence component 465-a may select the spreading sequences from the codebook based on the spreading factor, a total number of NOMA layers, and a layer identifier (e.g., Layer idx). The base station 105 may, for example, signal an indication of the total number of NOMA layers and the layer identifier. The layer identifier may be used to index the codebook to identify a particular spreading sequence includes the set of spreading sequences to be used by the UE 115.

In some examples, the spreading sequence codebook used by the spreading sequence component 465-a may be designed as a function of a spreading factor and a total number of NOMA Layers. In some cases, the total number of NOMA Layers may be greater than the spreading factor, and the length of the spreading sequence may be the same as the spreading factor. In some cases, the total number of NOMA layers may be the same as the number of transmitters in a group of NOMA transmitters configured for concurrent transmissions. The spreading sequence codebook may be composed of chirp-based spreading sequence sets that are configured to meet a Welch bound (e.g., optimized to meet a Welch bound). In some examples, the Welch bound may correspond to a defined cross correlation property for sequences within the chirp-based spreading sequence sets (e.g., Optimal Cross correlation property), and spreading using one of the spreading sequences may result in a constant, substantially constant, magnitude for each codeword (e.g., low PAPR for DFT-s-OFDM waveform) generated using one of the spreading sequences.

In some examples, each UE in a group of NOMA transmitters may have a single or multi-layer assignment, and each UE may perform single or multi-layer time domain spreading by a short sequence on its uplink data. For example, UE 115 may apply a spreading sequence specific to UE 115-c to the data symbol vector in the time domain. The spreading sequence (e.g., a short spreading sequence) may vary from UE 115 to UE 115 and spreading sequences for some UEs may be non-orthogonal with respect to each other. For single layer spreading, UE 115 may apply the UE-specific spreading sequence to the single layer to obtain a spread data symbol vector. For multi-layer spreading, UE 115-c may combine the multiple layers (e.g., by superimposing the layers on top of one another to create a pseudo single layer), and may apply the UE-specific spreading sequence to this combination of the multiple layers (e.g., associated with different data streams).

The spreading sequence component 465-a may apply a spreading sequence and output a spread data symbol vector to the sequence scrambler 470-a. A Gold sequence, a Chu sequence, a pseudo-noise (PN) sequence, or the like may be downselected to generate the scrambling sequence. In some examples, the base station 105 may configure the UE 115 with which scrambling sequence to apply, and the scrambling sequence may be specific to the UE 115 and the base station 105. In some cases, a base station 105 may configure each UE 115 that it serves with a different scrambling sequence. The spreading sequence component 465-a may apply a long sequence (e.g., specific to a particular UE/gNB combination) to generate a scrambled and spread data symbol vector. The tone mapper 445-a may assign symbols of the scrambled and spread data symbol vector to tones of the NOMA resources 320 that are adjacent in time and frequency for use in generation of a CP-OFDM waveform (e.g., a CP/DFT-S-OFDM waveform), such as by waveform generator 455 of FIG. 3.

In some examples, a spreading sequence codebook used by the spreading sequence component 465-a may be designed as a function of (e.g., to maximize) a signal-to-interference (S/I) ratio between UEs. A S/I ratio may be measured by cross-correlation between spreading sequences, where a smaller cross-correlation between spreading sequences implies a larger S/I ratio. Two techniques for determining a S/I ratio are a squared sum of cross correlation measures and pairwise cross correlation measures. The squared sum of cross correlation measures may be, for example, a valid metric for an additive white Gaussian noise (AWGN) channel with power control error (e.g., perfect power control). Pairwise cross correlation measures pairwise S/I between two UEs (e.g., between pairs of different spreading sequences), and may be robust to power control error, channel fading, or both.

In some examples, a set of spreading sequences of a codebook may be identified based on a squared sum of cross correlation measure (e.g., optimized based on a squared sum of cross correlation). In an example with 6 UEs and a spreading factor of 4 (e.g., N=6, K=4), a spreading sequence codebook, using expression (1) above, may be correspond to the spreading sequences set forth below in Table 1:

TABLE 1

| Sequence Number | Spreading Sequence |
| --- | --- |
| 0 | exp(−j*pi*[0:3].*[1:4]/6*1) |
| 1 | exp(−j*pi*[1:4].*[2:5]/6*1) |
| 2 | exp(−j*pi*[2:5].*[3:6]/6*1) |
| 3 | exp(−j*pi*[3:6].*[4:7]/6*1) |
| 4 | exp(−j*pi*[4:7].*[5:8]/6*1) |
| 5 | exp(−j*pi*[5:8].*[6:9]/6*1) |

The S/I ratio may be determined for each pair of the spreading sequences, resulting in cross correlation values as determined in Table 2:

TABLE 2

| | Sequence 0 | Sequence 1 | Sequence 2 | Sequence 3 | Sequence 4 | Sequence 5 |
| --- | --- | --- | --- | --- | --- | --- |
| Sequence 0 | 1.0000 | 0.4330 | 0.2500 | 0.0000 | 0.2500 | 0.4330 |
| Sequence 1 | 0.4330 | 1.0000 | 0.4330 | 0.2500 | 0.0000 | 0.2500 |
| Sequence 2 | 0.2500 | 0.4330 | 1.0000 | 0.4330 | 0.2500 | 0.0000 |
| Sequence 3 | 0.0000 | 0.2500 | 0.4330 | 1.0000 | 0.4330 | 0.2500 |
| Sequence 4 | 0.2500 | 0.0000 | 0.2500 | 0.4330 | 1.0000 | 0.4330 |
| Sequence 5 | 0.4330 | 0.2500 | 0.0000 | 0.2500 | 0.4330 | 1.0000 |

The diagonal in Table 2 corresponds to the autocorrelation of a spreading sequence with itself. The top row identifies the cross correlation values for sequence 0 with each of sequences 0 to 5 from table 1, the second row identifies the cross correlation values for sequence 1 with each of sequences 0 to 5 from table 1, and so forth. As can be seen, the cross correlation values are different depending on the pair of spreading sequences. In this example, for chirp sequence generation, the spreading sequences in Table 1 may achieve a sum Welch bound (e.g., the total squared sum may equal 9), may provide a constant, or substantially constant, PAPR, the codebook may scalable to a desired number of transmitters, and are a close form formula.

In some examples, short spreading sequences of a codebook may be generated based on pairwise cross correlation value (e.g., optimized based on pairwise cross correlation). In an example with 7 UEs and a spreading factor of 4 (e.g., N=7, K=4), a spreading sequence codebook, using expression (1) above, may be correspond to the spreading sequences set forth below in Table 3:

TABLE 3

| Sequence Number | Spreading Sequence |
| --- | --- |
| 0 | exp(−j*pi*[0:3].*[1:4]/7*0); |
| 1 | exp(−j*pi*[0:3].*[1:4]/7*1); |
| 2 | exp(−j*pi*[0:3].*[1:4]/7*2) |
| 3 | exp(−j*pi*[0:3].*[1:4]/7*3) |
| 4 | exp(−j*pi*[0:3].*[1:4]/7*4) |
| 5 | exp(−j*pi*[0:3].*[1:4]/7*5) |
| 6 | exp(−j*pi*[0:3].*[1:4]/7*6) |

The spreading sequences in this example may be truncated Chu sequences. The spreading sequences in Table 3 may also be expressed as follows.

$$\left[\exp\left(-j*\pi*0*1*\frac{1}{7}*0\right), \exp\left(-j*\pi*1*2*\frac{1}{7}*0\right),\right.$$
$$\left.\exp\left(-j*\pi*2*3*\frac{1}{7}*0\right), \exp\left(-j*\pi*3*4*\frac{1}{7}*0\right)\right] \quad \text{Sequence 0}$$

$$\left[\exp\left(-j*\pi*0*1*\frac{1}{7}*1\right), \exp\left(-j*\pi*1*2*\frac{1}{7}*1\right),\right.$$
$$\left.\exp\left(-j*\pi*2*3*\frac{1}{7}*1\right), \exp\left(-j*\pi*3*4*\frac{1}{7}*1\right)\right] \quad \text{Sequence 1}$$

$$\left[\exp\left(-j*\pi*0*1*\frac{1}{7}*2\right), \exp\left(-j*\pi*1*2*\frac{1}{7}*2\right),\right.$$
$$\left.\exp\left(-j*\pi*2*3*\frac{1}{7}*2\right), \exp\left(-j*\pi*3*4*\frac{1}{7}*2\right)\right] \quad \text{Sequence 2}$$

-continued $$\left[\exp\left(-j*\pi*0*1*\frac{1}{7}*3\right), \exp\left(-j*\pi*1*2*\frac{1}{7}*3\right),\right.$$
$$\left.\exp\left(-j*\pi*2*3*\frac{1}{7}*3\right), \exp\left(-j*\pi*3*4*\frac{1}{7}*3\right)\right]$$
Sequence 3

$$\left[\exp\left(-j*\pi*0*1*\frac{1}{7}*4\right), \exp\left(-j*\pi*1*2*\frac{1}{7}*4\right),\right.$$
$$\left.\exp\left(-j*\pi*2*3*\frac{1}{7}*4\right), \exp\left(-j*\pi*3*4*\frac{1}{7}*4\right)\right]$$
Sequence 4

$$\left[\exp\left(-j*\pi*0*1*\frac{1}{7}*5\right), \exp\left(-j*\pi*1*2*\frac{1}{7}*5\right),\right.$$
$$\left.\exp\left(-j*\pi*2*3*\frac{1}{7}*5\right), \exp\left(-j*\pi*3*4*\frac{1}{7}*5\right)\right]$$
Sequence 5

$$\left[\exp\left(-j*\pi*0*1*\frac{1}{7}*6\right), \exp\left(-j*\pi*1*2*\frac{1}{7}*6\right),\right.$$
$$\left.\exp\left(-j*\pi*2*3*\frac{1}{7}*6\right), \exp\left(-j*\pi*3*4*\frac{1}{7}*6\right)\right]$$
Sequence 6

The spreading sequences in Table 3 may be generalized to an arbitrary number of N spreading sequences, and expressed as follows, $$\left[\exp\left(-j*\pi*0*1*\frac{1}{N}*0\right), \exp\left(-j*\pi*1*2*\frac{1}{N}*0\right),\right.$$
$$\left.\ldots, \exp\left(-j*\pi*(K-1)*K*\frac{1}{N}*0\right)\right]$$
Sequence 0

$$\left[\exp\left(-j*\pi*0*1*\frac{1}{N}*1\right), \exp\left(-j*\pi*1*2*\frac{1}{N}*1\right),\right.$$
$$\left.\ldots, \exp\left(-j*\pi*(K-1)*K*\frac{1}{N}*1\right)\right]$$
Sequence 1

$$\left[\exp\left(-j*\pi*0*1*\frac{1}{N}*2\right), \exp\left(-j*\pi*1*2*\frac{1}{N}*2\right),\right.$$
$$\left.\ldots, \exp\left(-j*\pi*(K-1)*K*\frac{1}{N}*2\right)\right]$$
Sequence 2

$$\left[\exp\left(-j*\pi*0*1*\frac{1}{N}*(N-1)\right),\right.$$
$$\exp\left(-j*\pi*1*2*\frac{1}{N}*(N-1)\right), \ldots ,$$
$$\left.\exp\left(-j*\pi*(K-1)*K*\frac{1}{N}*(N-1)\right)\right]$$
Sequence N The S/I ratio may be determined for each pair of the spreading sequences in Table 3, resulting in cross correlation values as determined in Table 4:

TABLE 4

|  | Seq. 0 | Seq. 1 | Seq. 2 | Seq. 3 | Seq. 4 | Seq. 5 | Seq. 6 |
| --- | --- | --- | --- | --- | --- | --- | --- |
| Seq. 0 | 1.0000 | 0.3536 | 0.3536 | 0.3536 | 0.3536 | 0.3536 | 0.3536 |
| Seq. 1 | 0.3536 | 1.0000 | 0.3536 | 0.3536 | 0.3536 | 0.3536 | 0.3536 |
| Seq. 2 | 0.3536 | 0.3536 | 1.0000 | 0.3536 | 0.3536 | 0.3536 | 0.3536 |
| Seq. 3 | 0.3536 | 0.3536 | 0.3536 | 1.0000 | 0.3536 | 0.3536 | 0.3536 |
| Seq. 4 | 0.3536 | 0.3536 | 0.3536 | 0.3536 | 1.0000 | 0.3536 | 0.3536 |
| Seq. 5 | 0.3536 | 0.3536 | 0.3536 | 0.3536 | 0.3536 | 1.0000 | 0.3536 |
| Seq. 6 | 0.3536 | 0.3536 | 0.3536 | 0.3536 | 0.3536 | 0.3536 | 1.0000 |

In Table 4, the diagonal corresponds to the autocorrelation of a spreading sequence with itself. The top row identifies the cross correlation values for sequence 0 with each of sequences 0 to 5 from table 1, the second row identifies the cross correlation values for sequence 1 with each of sequences 0 to 5 from table 1, and so forth. As can be seen, the cross correlation values are the same for each pair of different spreading sequences in the codebook. In an example, the cross correlation values are equal and may be a theoretical optimal value.

Using any of expressions (1)-(3) described herein, a spreading sequence codebook, designed based on pairwise cross correlation values, may include sets of spreading sequences that satisfy a Root mean square (RMS) WBE for arbitrary configurations of (N, K). In some cases, the sets of spreading sequences may achieve both an MWBE and RMS WBE. Beneficially, the codebook, designed based on pairwise cross correlation values, may be used to generate codewords having a constant, or substantially constant, PAPR, are scalable to large number of transmitters, and have a compact sequence description in closed form.

The following Table 5 includes examples of codebook configurations that achieve MWBE and RMS WBE.

TABLE 5

| N (# of UE) | K (Spreading Factor) |
| --- | --- |
| 7 | 3 |
| 7 | 4 |
| 13 | 4 |
| 11 | 5 |
| 21 | 5 |
| 11 | 6 |
| 31 | 6 |
| 15 | 7 |
| 15 | 8 |
| 57 | 8 |
| 13 | 9 |
| 37 | 9 |
| 73 | 9 |
| 40 | 13 |

The base station 105 may signal an indication that indicates the number N of UEs and the spreading factor K in accordance with Table 5, and the UE 115 may determine a codebook that includes a set of spreading sequences corresponding to the signaled number N of UEs and the spreading factor. For example, the UE 115 may input the indicated values for N, K into expression (1), above, to determine a codebook that includes a set of distinct spreading sequences. The UE 115 may select a spreading sequence from the set, and apply the selected spreading sequence for spreading for uplink data as part of generating an uplink NOMA transmission. The base station 105 may similarly use inputs N, K in expression (1), above, to determine a set of distinct spreading sequences within a codebook, for processing concurrent NOMA transmission received from the group of transmitters.

Spreading sequences may be identified based on pairwise cross correlation using other techniques. In an example, a codebook that includes a set of spreading sequences may be obtained from a spreading sequence matrix, such a fast Fourier transform (FFT) matrix.

Below is an example of the FFT matrix whose size is N×N.

$$\begin{bmatrix} 1 & e^{j\frac{2\pi}{N}0} & \ldots & e^{j\frac{2\pi}{N}0(N-1)} \\ 1 & e^{j\frac{2\pi}{N}1} & \ldots & e^{j\frac{2\pi}{N}1(N-1)} \\ \vdots & \vdots & \vdots & \vdots \\ 1 & e^{j\frac{2\pi}{N}(N-1)} & \ldots & e^{j\frac{2\pi}{N}(N-1)(N-1)} \end{bmatrix}$$

A base station 105 and the UE 115 may be preconfigured with the FFT matrix, or the base station 105 may configure the UE 115 with the FFT matrix. Based on an indication received from the base station 105 or autonomous selection, each UE 115 selects a spreading sequence from a codebook generated from the FFT matrix that corresponds to the UE. In an example, the base station 105 may signal an indication that indicates the number N of UEs and the spreading factor, and the UE 115 may generate a codebook by inputting, into the FFT matrix, row selection values corresponding to the signaled number N of UEs and the spreading factor. The UE 115 may select a column from the codebook as a spreading sequence, and apply the selected spreading sequence when spreading for data. In some examples, a codebook generated from an FFT matrix input with row selection values corresponding to the signaled number N of UEs and the spreading factor K may define a set of spreading sequences that achieve MWBE and RMS WBE.

Table 6 provides examples of a codebook configuration that achieves MWBE and RMS WBE.

TABLE 6

| N (# of UE) | K (Spreading Factor) | Row Selection (for $u_i$) |
|---|---|---|
| 7  | 3  | 1, 2, 4 |
| 7  | 4  | 0, 3, 5, 6 |
| 13 | 4  | 0, 1, 3, 9 |
| 11 | 5  | 1, 3, 4, 5, 9 |
| 21 | 5  | 3, 6, 7, 12, 14 |
| 11 | 6  | 0, 2, 6, 7, 8, 10 |
| 31 | 6  | 1, 5, 11, 24, 25, 27 |
| 15 | 7  | 0, 1, 2, 4, 5, 8, 10 |
| 15 | 8  | 3, 6, 7, 9, 11, 12, 13, 14 |
| 57 | 8  | 1, 6, 7, 9, 19, 38, 42, 49 |
| 13 | 9  | 2, 4, 5, 6, 7, 8, 10, 11, 12 |
| 37 | 9  | 1, 7, 9, 10, 12, 16, 32, 37, 55, 64 |
| 73 | 9  | 1, 2, 4, 8, 16, 32, 37, 55, 64 |
| 40 | 13 | 0, 1, 3, 5, 9, 15, 22, 25, 26, 27, 34, 35, 38 |

Table 6 may be indexed based on the number N of UEs and the spreading factor K to determine row selection values for $u_i$ for input into an FFT matrix. An example codebook determined from inputting row selection values for $u_i$ into an FFT matrix is provided below.

$$\begin{bmatrix} 1 & e^{j\frac{2\pi}{N}u_1} & \cdots & e^{j\frac{2\pi}{N}u_1(N-1)} \\ 1 & e^{j\frac{2\pi}{N}u_2} & \cdots & e^{j\frac{2\pi}{N}u_2(N-1)} \\ \vdots & \vdots & \vdots & \vdots \\ 1 & e^{j\frac{2\pi}{N}u_K} & \cdots & e^{j\frac{2\pi}{N}u_K(N-1)} \end{bmatrix}$$

In an example, when N=7 (e.g., group of 7 UEs), and K=3, the row selection values for $u_i$ from Table 6 above are $u_1$=1, $u_2$=2, $u_3$=4. In another example, when N=7 (e.g., group of 7 UEs), and K=4, the row selection values for $u_i$ from Table 6 above are $u_1$=0, $u_2$=3, $u_3$=5, $u_4$=6. The values for $u_i$ may be input into the FFT matrix provided above for generating a codebook corresponding to the number of transmitters and the spreading factor. A spreading sequence may be a particular column in the codebook. Inputting the row selection values for $u_i$ into the FFT matrix corresponding to N, K may be used to generate a codebook where each column is a different spreading sequence. In this example, the codebook includes K columns and N rows, and hence is of size K×N. Thus, the UE 115 and the base station 105 may each generate a codebook based on the FFT matrix and indexing table 6 using values for N and K.

In an example, the base station 105 may signal an indication that indicates the number N of UEs and the spreading factor (e.g., K), and the UE 115 may identify row selection values for $u_i$ from Table 6 corresponding to the signaled number N of UEs and the spreading factor. The UE 115 may use the $u_i$ values from the row selection in the FFT matrix, above, to generate a codebook where columns of the codebook define a set of spreading sequences. The UE 115 may select a spreading sequence from the set (e.g., select a particular column from the codebook), and apply the selected spreading sequence when spreading data for an uplink NOMA transmission. The base station 105 may similarly use inputs N, K to identify a row selection, and may use values from the row selection in the FFT matrix, above, to generate the same codebook that includes the same set of spreading sequences. The UE 115 may use a spreading sequence from the codebook for spreading uplink data, and the base station 105 may use the codebook when despreading concurrent uplink NOMAs transmission received from the UE 115 and other transmitters from a group of NOMA transmitters.

A spreading sequence codebook generated in accordance with the techniques provided herein may be, in some examples, pairwise cross correlation optimal spreading sequence sets corresponding to a total number of RSMA layers and a Spreading Factor.

In some cases, a UE 115 may have two types of different spreading sequence codebooks. A first spreading sequence codebook may be optimized for a total squared sum of cross correlation, and a second spreading sequence codebook may be optimized for pairwise cross correlation. Depending on the total number of RSMA layers and the Spreading Factor, the UE 115 may select which of the spreading sequence codebooks to use when generating an uplink transmission. In some examples, the UE 115 may use spreading sequences optimized for pairwise cross correlation when the base station 105 indicates a total number of RSMA layers and spreading factor.

FIG. 6 illustrates an example of a receive chain 600 that supports pairwise cross correlation sequences for non-orthogonal multiple access wireless communications in accordance with various aspects of the present disclosure. In some examples, receive chain 600 may implement aspects of wireless communications system 100 or 200. The transmit chain 600 may be implemented in a base station (e.g., a base station 105 of FIG. 1 or 2), although the concepts provided herein may be applied to any NOMA receiver.

In this example, radio frequency (RF) signals are received at antenna 605 (which may include one or more antenna elements) and provided to RF transmit/receive components 610, which may various filtering and power amplification functions and provide the received signals to resource demapping component 615. Resource demapping component 615 may demap the received signals based on NOMA resources that are mapped to a group of NOMA transmitters and provide demapped signals to a NOMA MUD 620. The MUD 620 may decode the received signals according to NOMA decoding techniques (e.g., SIC, RSMA, etc.), and provide a number (N) of spreading sequences of modulation symbols $\{s_n(1)d(l), s_n(2)d(l), \ldots s_n(K)d(l)\}$ that may be processed serially or in parallel. For each of the number of spreading sequences of modulation symbols, sequence dispreading component 630 may despread the symbols to provide a sequence of modulation symbols $\{d(l)\}$ for each of the NOMA transmitters that concurrently transmitted using the configured NOMA resources. In some cases, each spreading sequence may be randomly selected by a particular NOMA transmitter or may be assigned to each transmitter by a base station. If a scrambling sequence was used by the transmitter, the sequence dispreading component 630 may despread and descramble to provide a sequence of modulation symbols {d(l)} for each of the NOMA transmitters that concurrently transmitted using the configured NOMA resources. The sequence of modulation symbols may be provided to demodulator 635 which may demodulate the symbols in accordance with the MCS used by the transmitters. The demodulated data may be provided to channel decoding component 640, which may decode the data in accordance with channel coding that was used for the transmissions, and output the downlink data to a data sink within the receiver.

Figure 7:
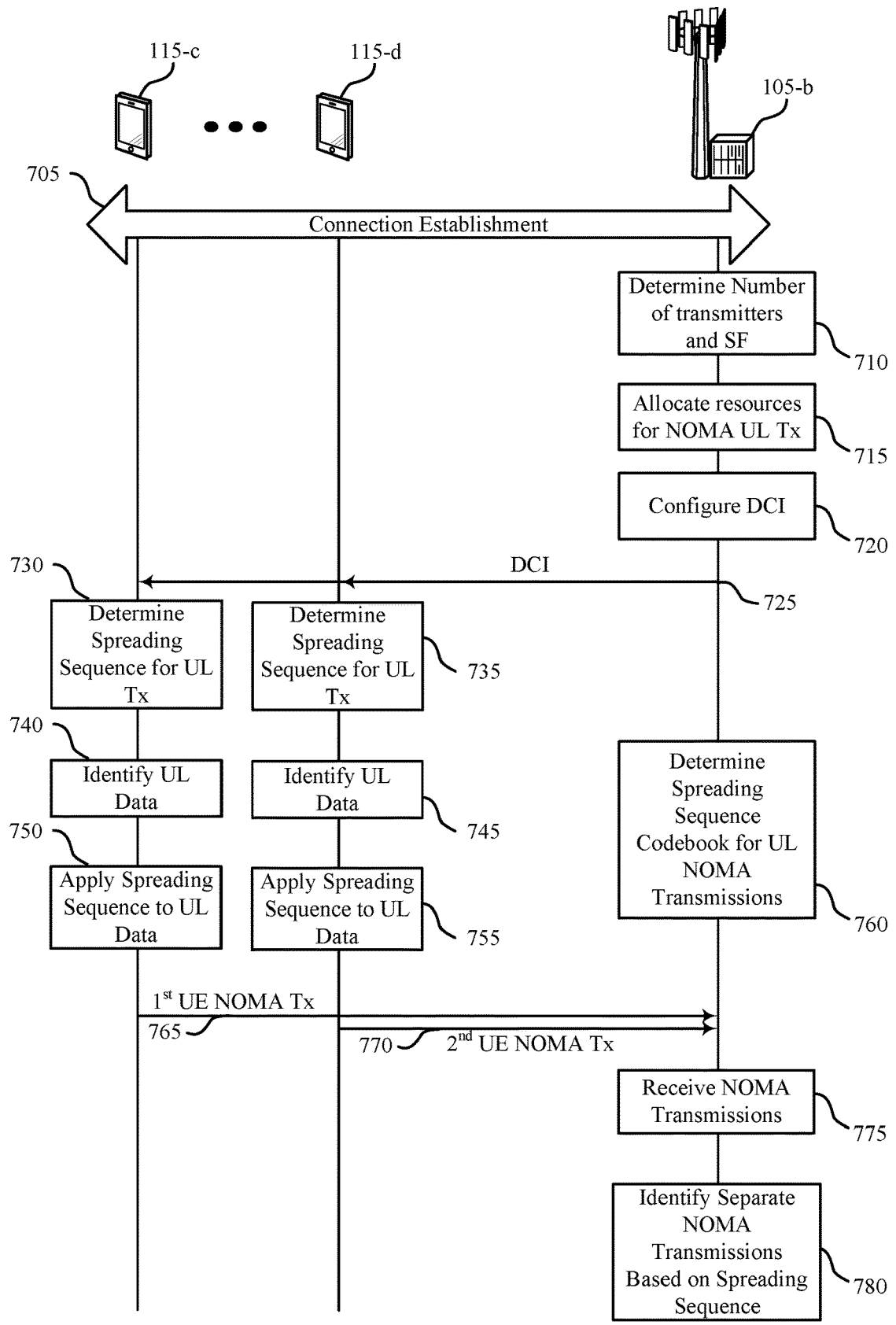
FIG. 7 illustrates an example of a process flow that supports pairwise cross correlation sequences for non-orthogonal multiple access wireless communications in accordance with aspects of the present disclosure.

FIG. 7 illustrates an example of a process flow 700 that supports pairwise cross correlation sequences for non-orthogonal multiple access wireless communications in accordance with various aspects of the present disclosure. In some examples, process flow 700 may be implemented in aspects of wireless communications system 100 or 200. Process flow 700 may include a base station 105-b, a first UE 115-c, and a second UE 115-d. The base station 105-b may be an example of a base station 105 of FIG. 1 or 2, and the UEs 115 may be examples of UEs 115 of FIG. 1 or 2. Initially, the base station 105-b may perform a connection establishment 705 according to established connection establishment techniques. In some cases, the base station 105-b may configure the UEs 115 for NOMA transmissions as part of a NOMA transmission group.

At 710, the base station 105-b may determine a number of NOMA transmitters that may transmit in a NOMA transmitter group and a spreading factor. In some cases, the number of NOMA transmitters may be determined based on a number of UEs 115 that are to be served, a number of available resources for transmissions, or any combination thereof.

At 715, the base station 105-b may allocate resources for a NOMA uplink transmission. The resources may be allocated in one or more dimensions, including time, frequency, or space dimensions, or any combination thereof. In some cases, the allocated resources may include a number of OFDM symbols, or RBs, and the number and configuration of resources may be used.

At 720, the base station 105-b may configure downlink control information (DCI) for transmission to the UEs 115, and may transmit the DCI 725 to the UEs 115. The DCI 725 may include an indication of the allocated NOMA resources, an MCS to be used for the NOMA transmissions, an indication of a number of expected NOMA transmitters (e.g., N), and an indication of a spreading factor (e.g., K), for example. In some cases, the indication may be a first index value to indicate the spreading factor and a second index value to indicate the number of transmitters in the group of NOMA transmitters. The first index value and the second index value may be a bit sequence indicating respective numbers, or may be used to index a table stored at the UEs 115 that indicates the respective numbers. In some cases, a master information block (MIB), a system information block (SIB), remaining minimum system information (RMSI), or any combination thereof, may provide the indication.

At 730, the first UE 115-c may determine a spreading sequence for an uplink NOMA transmission. Similarly, at 735, the second UE 115-d may determine a spreading sequence for the uplink NOMA transmission. The spreading sequence may be determined as discussed above, by identifying a spreading sequence from a codebook of spreading sequences having a defined cross correlation property. In some cases, the UEs 115-c, 115-d may determine a set of spreading sequences by apply any of expressions (1)-(3), above, with inputs N, K as indicated by the base station 105-b. A particular spreading sequence at each UE 115 may be determined based on an index into the codebook for the particular UE 115. In some cases, the value of the index for each UE 115 may be provided by the base station 105-b in the indication. In other cases, each UE 115 may randomly select the value of the index to identify a spreading sequence from the codebook.

At 740, the first UE 115-c may identify uplink data for a NOMA transmission. Similarly, at 745, the second UE 115-d may identify uplink data for a NOMA transmission. The uplink data may be data from a transmit buffer at each UE 115, for example.

At 750, the first UE 115-c may apply its identified spreading sequence to its uplink data. Similarly, at 755, the second UE 115-d may apply its spreading sequence to its uplink data. After applying the respective spreading sequences to the uplink data, each UE 115 may perform resource mapping and transmit their respective uplink transmissions, such as discussed above. In the example of FIG. 6, the first UE 115-c may transmit a first UE NOMA transmission 765 using the same allocated uplink resources as the second UE 115-d for transmission of a second UE NOMA transmission 770.

At 760, the base station 105-b may determine a spreading sequence codebook for uplink NOMA transmissions corresponding to the spreading factor and the number of NOMA transmitters, using any of expressions (1)-(3), above, with inputs N, K as indicated to the UEs 115-c, 115-d.

At 775, the base station 105-b may receive the NOMA transmissions. As discussed above, when receiving NOMA transmissions, the base station 105-b may perform NOMA processing, such as SIC/RSMA processing at a MUD to identity a number of separate NOMA transmissions.

At 780, the base station 105-b may identify separate NOMA transmissions based on the spreading sequences from the determined codebook applied to the NOMA transmissions. In some cases, the received transmissions may be despread in accordance with the available spreading sequences to generate a number of sets of modulation symbols that may be decoded by the base station 105-b to generate uplink data that was transmitted by each UE 115.

Figure 8:
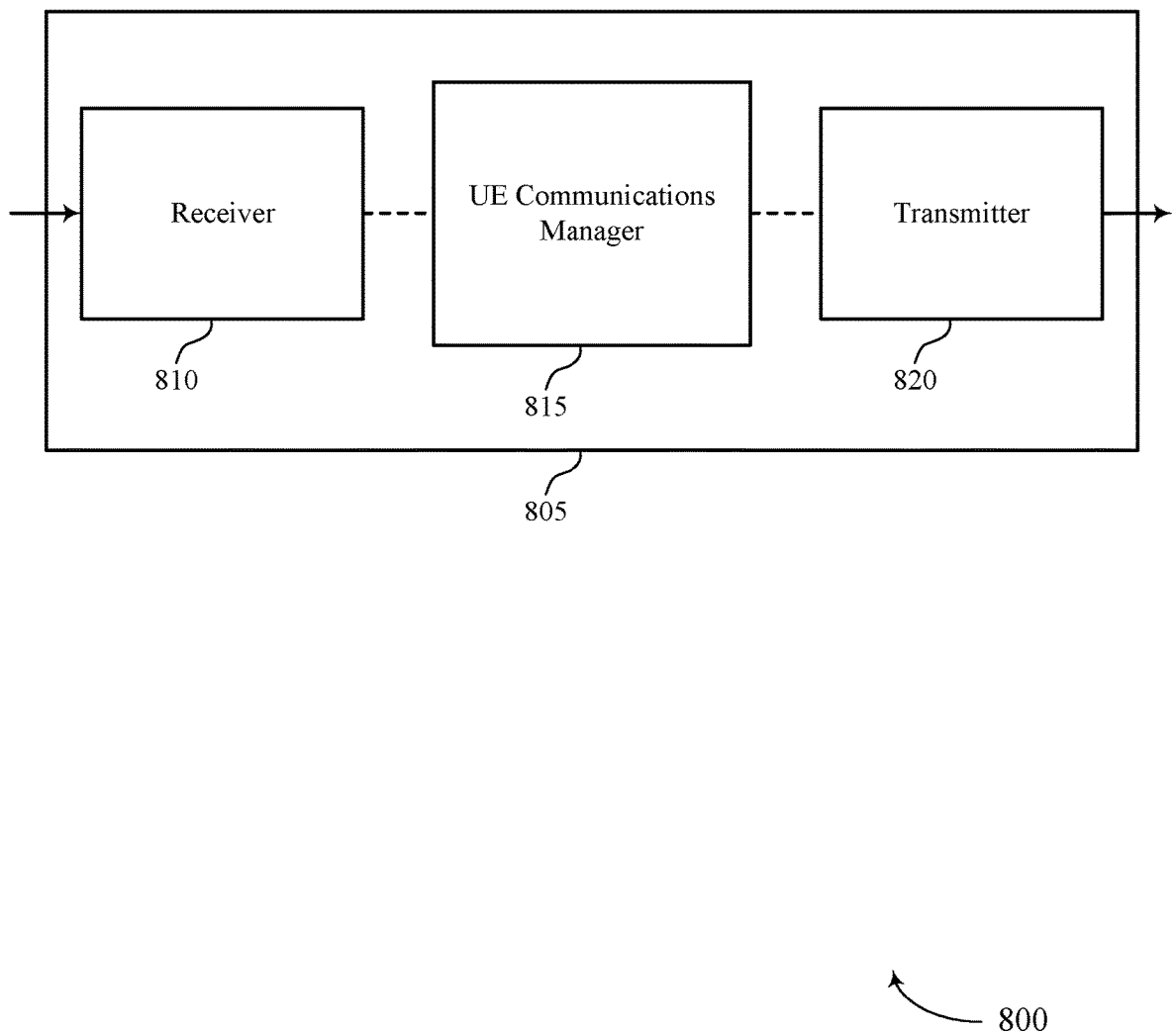
FIGS. 8 through 10 show block diagrams of a device that supports pairwise cross correlation sequences for non-orthogonal multiple access wireless communications in accordance with aspects of the present disclosure.

FIG. 8 shows a block diagram 800 of a wireless device 805 that supports pairwise cross correlation sequences for non-orthogonal multiple access wireless communications in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to pairwise cross correlation sequences for non-orthogonal multiple access wireless communications, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, from a base station, an indication of a spreading factor and a number of transmitters in a group of NOMA transmitters configured for concurrent transmissions, determine, based on the spreading factor and the number of transmitters, a first spreading sequence of a set of spreading sequences from a first codebook, the first spreading sequence having a defined value for pairwise cross correlation with each spreading sequence of the set of spreading sequences, identify data to be transmitted in an uplink transmission, apply the first spreading sequence to the data to be transmitted in the uplink transmission, and transmit the uplink transmission to the base station.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
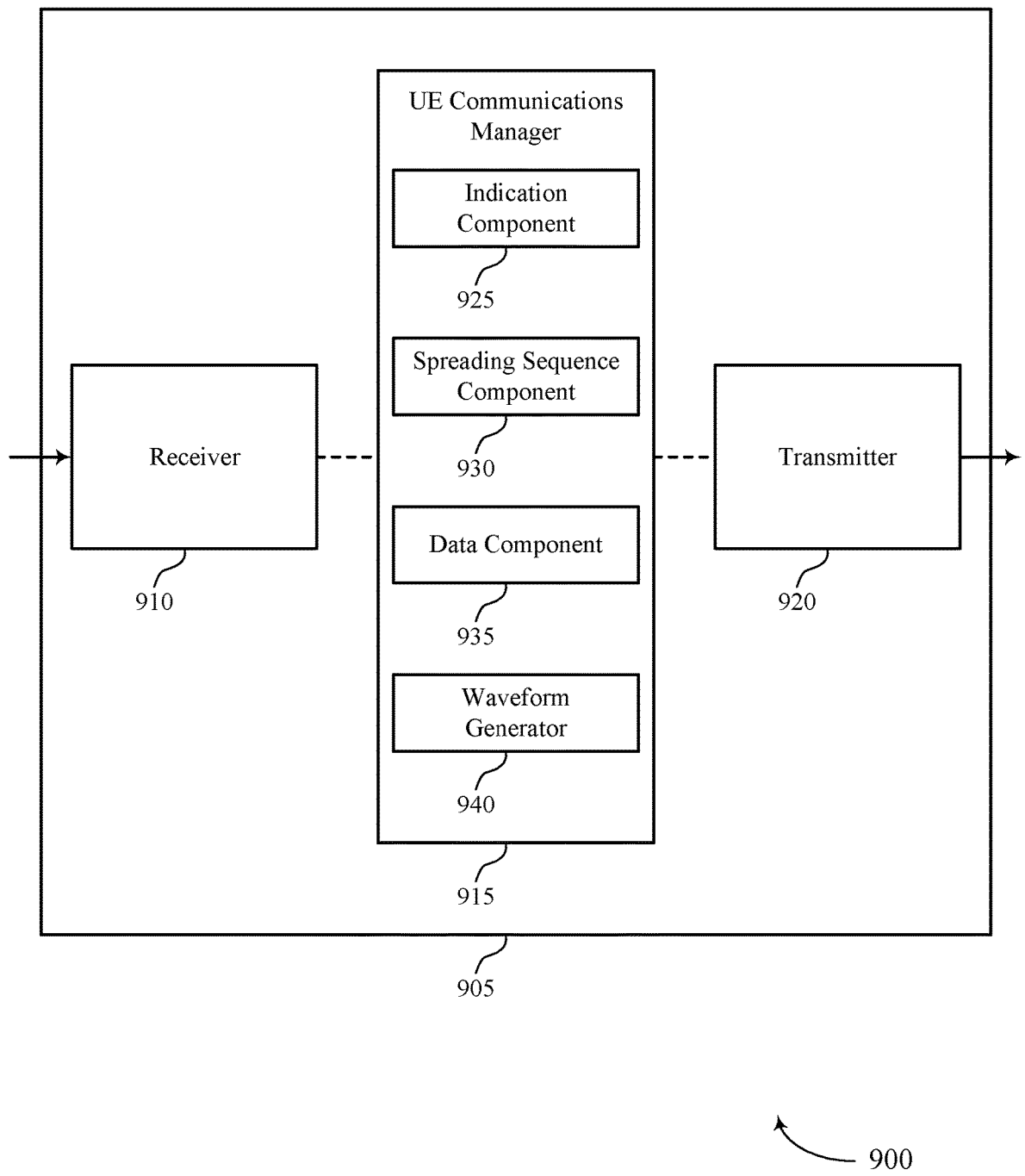

FIG. 9 shows a block diagram 900 of a wireless device 905 that supports pairwise cross correlation sequences for non-orthogonal multiple access wireless communications in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to pairwise cross correlation sequences for non-orthogonal multiple access wireless communications, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11.

UE communications manager 915 may also include indication component 925, spreading sequence component 930, data component 935, and waveform generator 940.

Indication component 925 may receive, from a base station, an indication of a spreading factor and a number of transmitters in a group of NOMA transmitters configured for concurrent transmissions.

Spreading sequence component 930 may determine, based on the spreading factor and the number of transmitters, a first spreading sequence of a set of spreading sequences from a first codebook, the first spreading sequence having a defined value for pairwise cross correlation with each spreading sequence of the set of spreading sequences, identify a set of codebooks that each include a set of spreading sequences, the set of codebooks including the first codebook, select the first codebook from the set of codebooks based on the indication including a first index value associated with the spreading factor and a second index value associated with the number of transmitters in the group of NOMA transmitters, and apply the first spreading sequence to the data to be transmitted in the uplink transmission. In some cases, the indication is received from the base station in DCI, in an MIB, in an SIB, in RMSI, or any combination thereof.

In some cases, determining the first spreading sequence further includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook. In some cases, the spreading sequence matrix is a fast Fourier transform matrix. In some cases, the first spreading sequence is applied to each modulation symbol of the series of modulation symbols. In some cases, the number of transmitters corresponds to a number of RSMA layers. In some cases, each spreading sequence of the set of spreading sequences is a truncated Chu sequence. In some cases, the defined value is a constant cross correlation value. In some cases, a set of spreading sequences of a second codebook of the set of codebooks are generated as a function of a total squared sum of cross correlation for spreading sequence pairs from the set of spreading sequences of the second codebook.

Data component 935 may identify data to be transmitted in an uplink transmission. Waveform generator 940 may transmit the uplink transmission to the base station.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
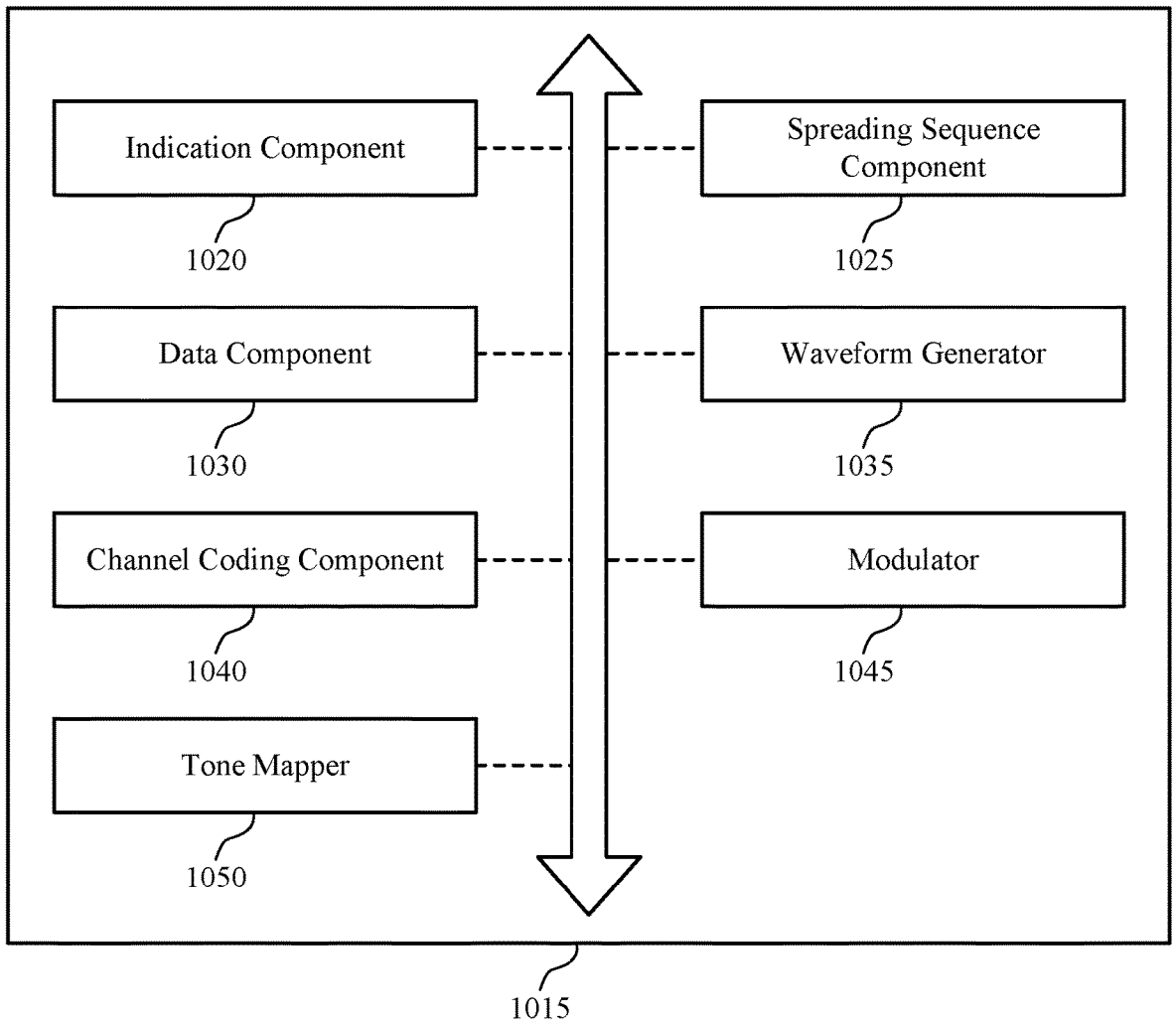

FIG. 10 shows a block diagram 1000 of a UE communications manager 1015 that supports pairwise cross correlation sequences for non-orthogonal multiple access wireless communications in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include indication component 1020, spreading sequence component 1025, data component 1030, waveform generator 1035, channel coding component 1040, modulator 1045, and tone mapper 1050. Each of these modules may communicate, directly or indirectly, with one another (e.g., via one or more buses).

Indication component 1020 may receive, from a base station, an indication of a spreading factor and a number of transmitters in a group of NOMA transmitters configured for concurrent transmissions.

Spreading sequence component 1025 may determine, based on the spreading factor and the number of transmitters, a first spreading sequence of a set of spreading sequences from a first codebook, the first spreading sequence having a defined value for pairwise cross correlation with each spreading sequence of the set of spreading sequences, identify a set of codebooks that each include a set of spreading sequences, the set of codebooks including the first codebook, select the first codebook from the set of codebooks based on the indication including a first index value associated with the spreading factor and a second index value associated with the number of transmitters in the group of NOMA transmitters, and apply the first spreading sequence to the data to be transmitted in the uplink transmission. In some cases, the indication is received from the base station in DCI, in an MIB, in an SIB, in RMSI, or any combination thereof.

In some cases, determining the first spreading sequence further includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook. In some cases, the spreading sequence matrix is a fast Fourier transform matrix. In some cases, the first spreading sequence is applied to each modulation symbol of the series of modulation symbols. In some cases, the number of transmitters corresponds to a number of RSMA layers. In some cases, each spreading sequence of the set of spreading sequences is a truncated Chu sequence. In some cases, the defined value is a constant cross correlation value. In some cases, a set of spreading sequences of a second codebook of the set of codebooks are generated as a function of a total squared sum of cross correlation for spreading sequence pairs from the set of spreading sequences of the second codebook.

Data component 1030 may identify data to be transmitted in an uplink transmission. Waveform generator 1035 may transmit the uplink transmission to the base station. Channel coding component 1040 may channel coding the data to be transmitted to generate channel coded data. Modulator 1045 may modulate the channel coded data to generate a series of modulation symbols.

Tone mapper 1050 may map the spread series of modulation symbols to resources allocated for the concurrent transmissions, where the resources include frequency resources, time resources, spatial resources, or any combination thereof.

Figure 11:
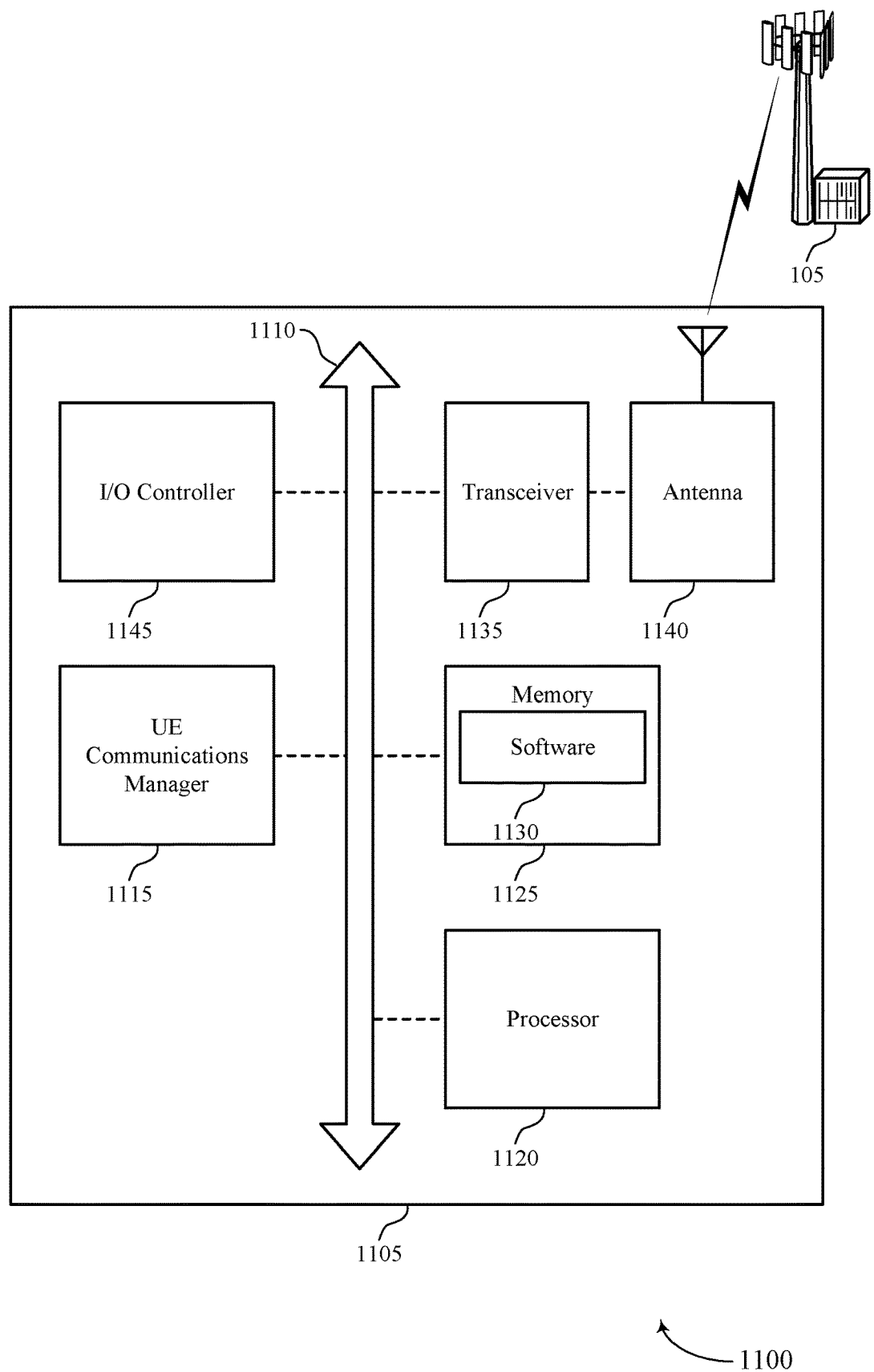
FIG. 11 illustrates a block diagram of a system including a UE that supports pairwise cross correlation sequences for non-orthogonal multiple access wireless communications in accordance with aspects of the present disclosure.

FIG. 11 shows a diagram of a system 1100 including a device 1105 that supports pairwise cross correlation sequences for non-orthogonal multiple access wireless communications in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting pairwise cross correlation sequences for non-orthogonal multiple access wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support pairwise cross correlation sequences for non-orthogonal multiple access wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
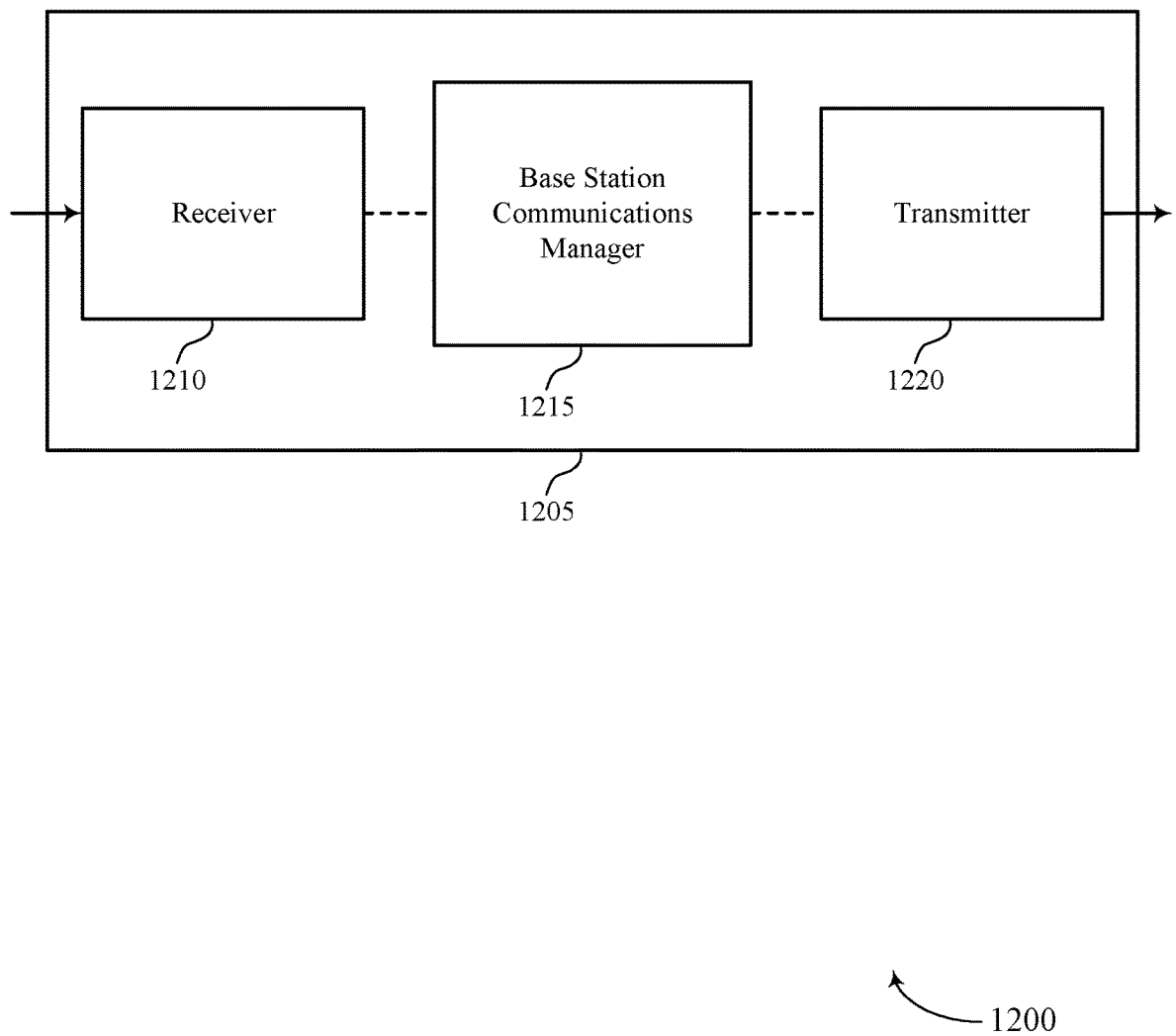
FIGS. 12 through 14 show block diagrams of a device that supports pairwise cross correlation sequences for non-orthogonal multiple access wireless communications in accordance with aspects of the present disclosure.

FIG. 12 shows a block diagram 1200 of a wireless device 1205 that supports pairwise cross correlation sequences for non-orthogonal multiple access wireless communications in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to pairwise cross correlation sequences for non-orthogonal multiple access wireless communications, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify a group of transmitters configured for concurrent NOMA transmissions, transmit, to the group of transmitters, an indication of a spreading factor for an uplink transmission and a number of transmitters in the group of transmitters, determine, based on the spreading factor and the number of transmitters, a first codebook including a set of spreading sequences for uplink transmissions, a first spreading sequence of the set of spreading sequences having a defined value for pairwise cross correlation with at least a subset of the set of spreading sequences, receive at least two concurrent NOMA transmissions from at least two transmitters of the group of transmitters, and identify which transmitter of the group of transmitters transmitted each of the at least two concurrent NOMA transmissions, based on the first spreading sequence and a second spreading sequence that are respectively applied to the at least two concurrent NOMA transmissions.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
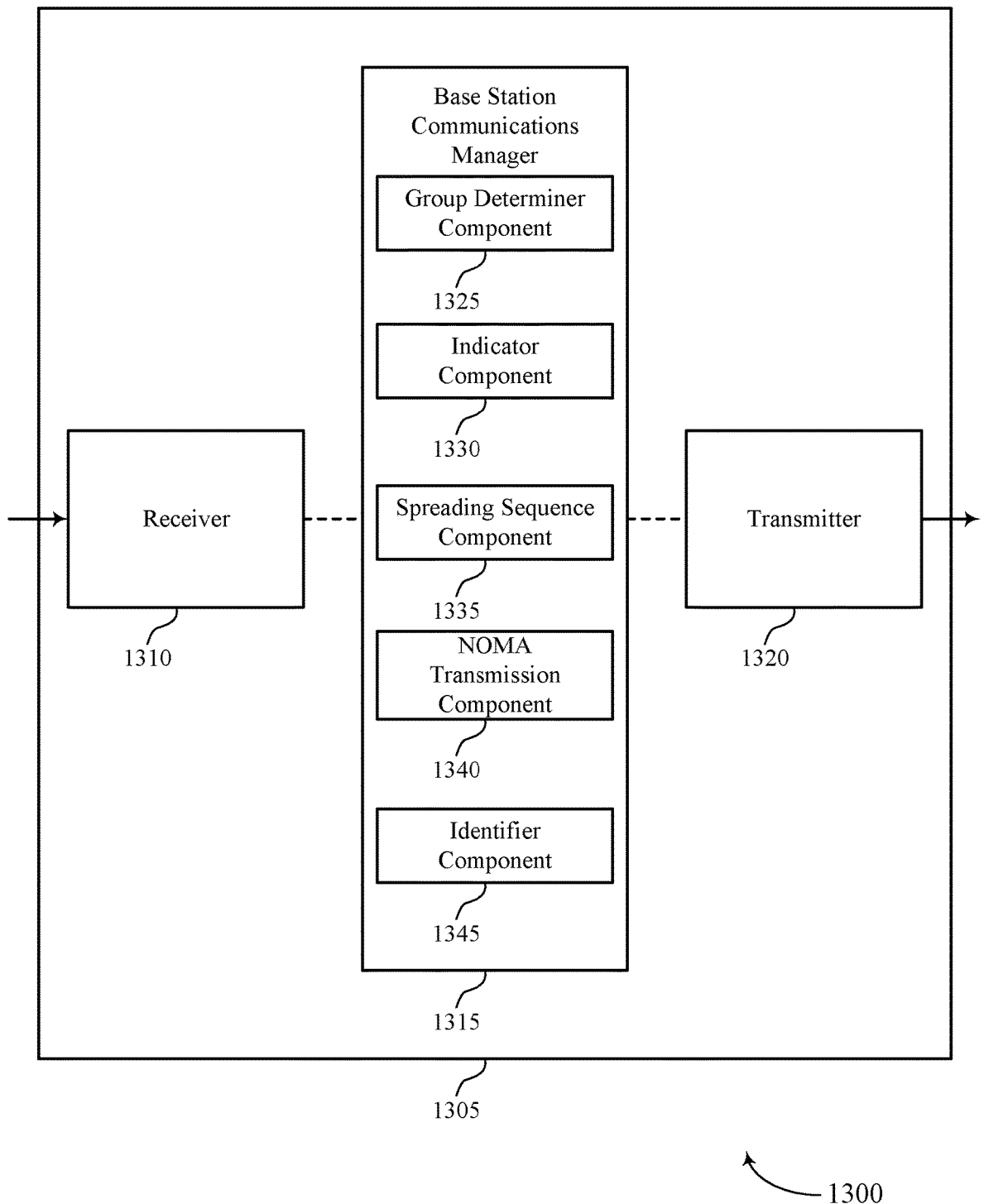

FIG. 13 shows a block diagram 1300 of a wireless device 1305 that supports pairwise cross correlation sequences for non-orthogonal multiple access wireless communications in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to pairwise cross correlation sequences for non-orthogonal multiple access wireless communications, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15.

Base station communications manager 1315 may also include group determiner component 1325, indicator component 1330, spreading sequence component 1335, NOMA transmission component 1340, and identifier component 1345.

Group determiner component 1325 may identify a group of transmitters configured for concurrent NOMA transmissions.

Indicator component 1330 may transmit, to the group of transmitters, an indication of a spreading factor for an uplink transmission and a number of transmitters in the group of transmitters.

Spreading sequence component 1335 may determine, based on the spreading factor and the number of transmitters, a first codebook including a set of spreading sequences for uplink transmissions, a first spreading sequence of the set of spreading sequences having a defined value for pairwise cross correlation with at least a subset of the set of spreading sequences and determine a spreading sequence applied to each spread set of modulation symbols. In some cases, determining the first codebook includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook. In some cases, the spreading sequence matrix is a fast Fourier transform matrix.

In some cases, determining the first codebook includes: identifying a set of codebooks that each include a set of spreading sequences, the set of codebooks including the first codebook. In some cases, a set of spreading sequences of a second codebook of the set of codebooks are generated as a function of a total squared sum of cross correlation for spreading sequence pairs from the set of spreading sequences of the second codebook. In some cases, a configuration and size of the first codebook, and a spreading scheme is transmitted in DCI, in an MIB, in an SIB, in RMSI, in a payload of a group common PDCCH transmission, or any combination thereof. In some cases, the number of transmitters corresponds to a number of RSMA layers. In some cases, each spreading sequence in the set of spreading sequences is a truncated Chu sequence. In some cases, the defined value is a constant cross correlation value.

NOMA transmission component 1340 may receive at least two concurrent NOMA transmissions from at least two transmitters of the group of transmitters.

Identifier component 1345 may identify which transmitter of the group of transmitters transmitted each of the at least two concurrent NOMA transmissions, based on the first spreading sequence and a second spreading sequence that are respectively applied to the at least two concurrent NOMA transmissions and identify which transmitter of the group of transmitters transmitted each received transmission based on the determined spreading sequence.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
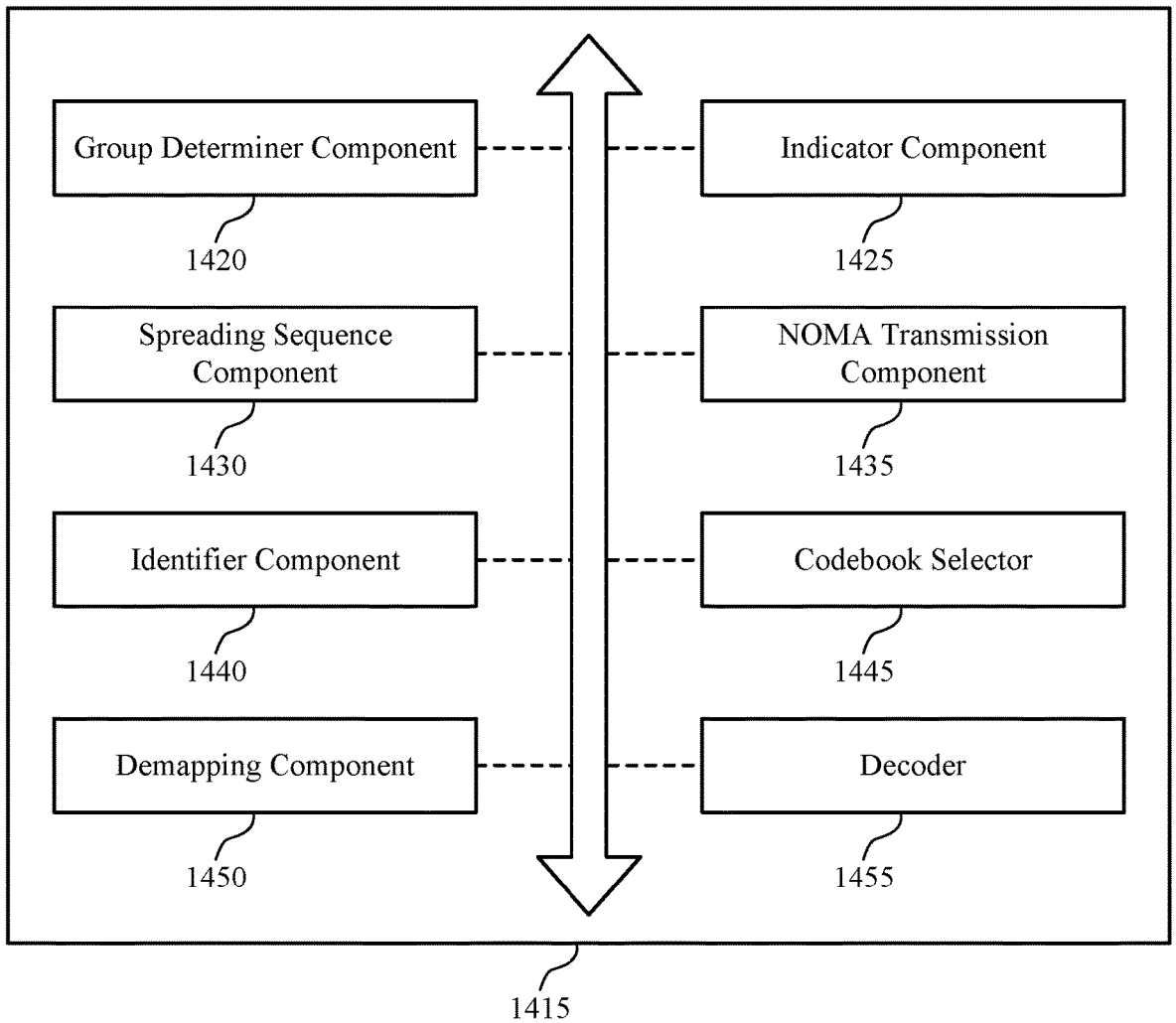

FIG. 14 shows a block diagram 1400 of a base station communications manager 1415 that supports pairwise cross correlation sequences for non-orthogonal multiple access wireless communications in accordance with aspects of the present disclosure. The base station communications manager 1415 may be an example of aspects of a base station communications manager 1515 described with reference to FIGS. 12, 13, and 15. The base station communications manager 1415 may include group determiner component 1420, indicator component 1425, spreading sequence component 1430, NOMA transmission component 1435, identifier component 1440, codebook selector 1445, demapping component 1450, and decoder 1455. Each of these modules may communicate, directly or indirectly, with one another (e.g., via one or more buses).

Group determiner component 1420 may identify a group of transmitters configured for concurrent NOMA transmissions.

Indicator component 1425 may transmit, to the group of transmitters, an indication of a spreading factor for an uplink transmission and a number of transmitters in the group of transmitters.

Spreading sequence component 1430 may determine, based on the spreading factor and the number of transmitters, a first codebook including a set of spreading sequences for uplink transmissions, a first spreading sequence of the set of spreading sequences having a defined value for pairwise cross correlation with at least a subset of the set of spreading sequences and determine a spreading sequence applied to each spread set of modulation symbols. In some cases, determining the first codebook includes: indexing a table based at least in part on the spreading factor and the number of transmitters to determine a plurality of row selection values, and generating the first codebook from a spreading sequence matrix based at least in part on the plurality of row selection values, where the first spreading sequence corresponds to a column in the first codebook. In some cases, the spreading sequence matrix is a fast Fourier transform matrix.

In some cases, determining the first codebook includes: identifying a set of codebooks that each include a set of spreading sequences, the set of codebooks including the first codebook. In some cases, a set of spreading sequences of a second codebook of the set of codebooks are generated as a function of a total squared sum of cross correlation for spreading sequence pairs from the set of spreading sequences of the second codebook. In some cases, a configuration and size of the first codebook, and a spreading scheme is transmitted in DCI, in an MIB, in an SIB, in RMSI, in a payload of a group common PDCCH transmission, or any combination thereof. In some cases, the number of transmitters corresponds to a number of RSMA layers. In some cases, each spreading sequence in the set of spreading sequences is a truncated Chu sequence. In some cases, the defined value is a constant cross correlation value.

NOMA transmission component 1435 may receive at least two concurrent NOMA transmissions from at least two transmitters of the group of transmitters.

Identifier component 1440 may identify which transmitter of the group of transmitters transmitted each of the at least two concurrent NOMA transmissions, based on the first spreading sequence and a second spreading sequence that are respectively applied to the at least two concurrent NOMA transmissions and identify which transmitter of the group of transmitters transmitted each received transmission based on the determined spreading sequence.

Codebook selector 1445 may select the first codebook of the set of codebooks based on a first index value associated with the spreading factor and a second index value associated with the number of transmitters in the group of transmitters.

Demapping component 1450 may demap the at least two concurrent NOMA transmissions to generate a despreaded set of modulation symbols.

Decoder 1455 may combine the despreaded set of modulation symbols based on the set of spreading sequences in the first codebook. In some cases, receiving the at least two concurrent NOMA transmissions further includes: demodulating and decoding the despreaded set of modulation symbols.

Figure 15:
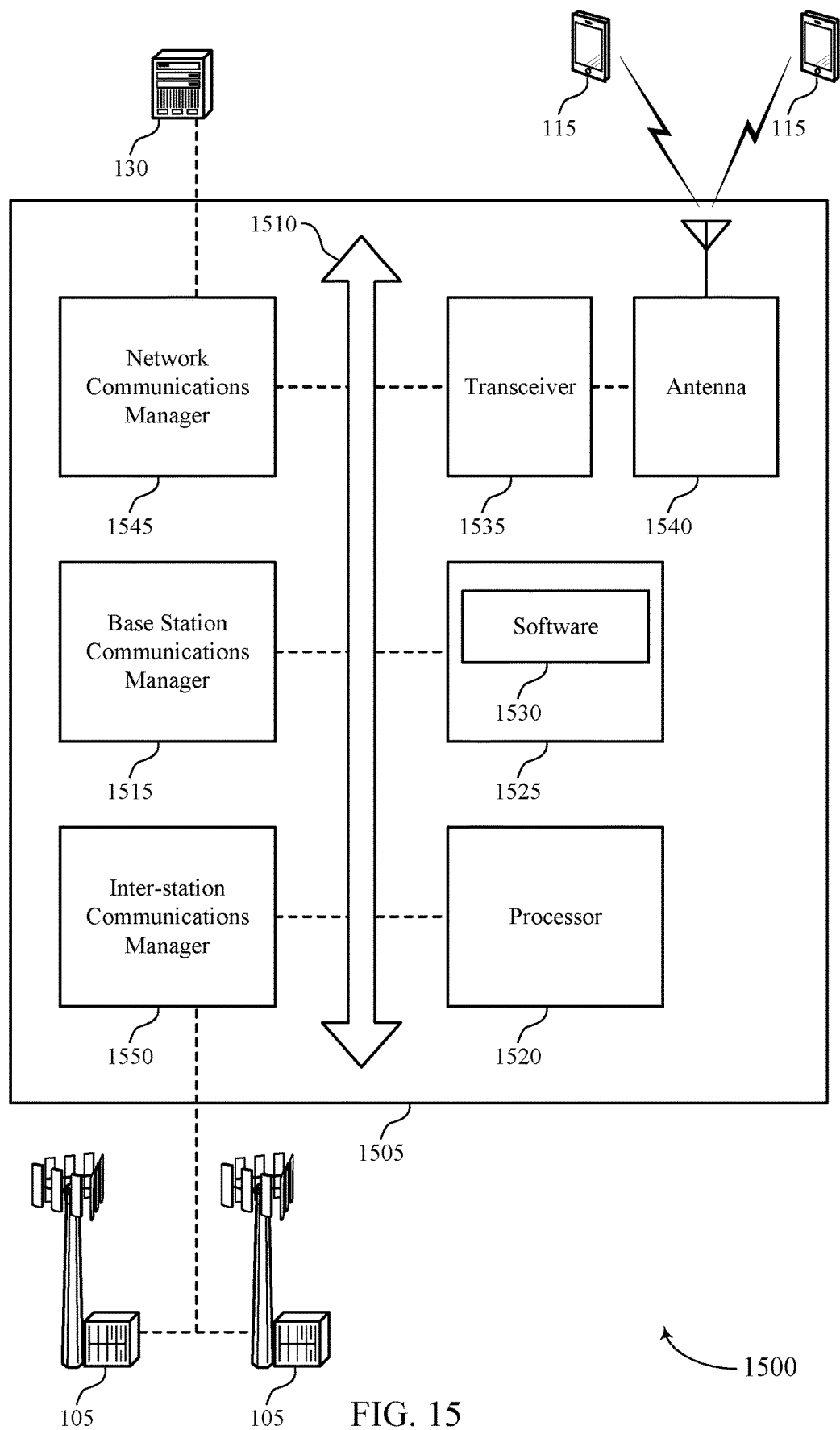
FIG. 15 illustrates a block diagram of a system including a base station that supports pairwise cross correlation sequences for non-orthogonal multiple access wireless communications in accordance with aspects of the present disclosure.

FIG. 15 shows a diagram of a system 1500 including a device 1505 that supports pairwise cross correlation sequences for non-orthogonal multiple access wireless communications in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting pairwise cross correlation sequences for non-orthogonal multiple access wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support pairwise cross correlation sequences for non-orthogonal multiple access wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
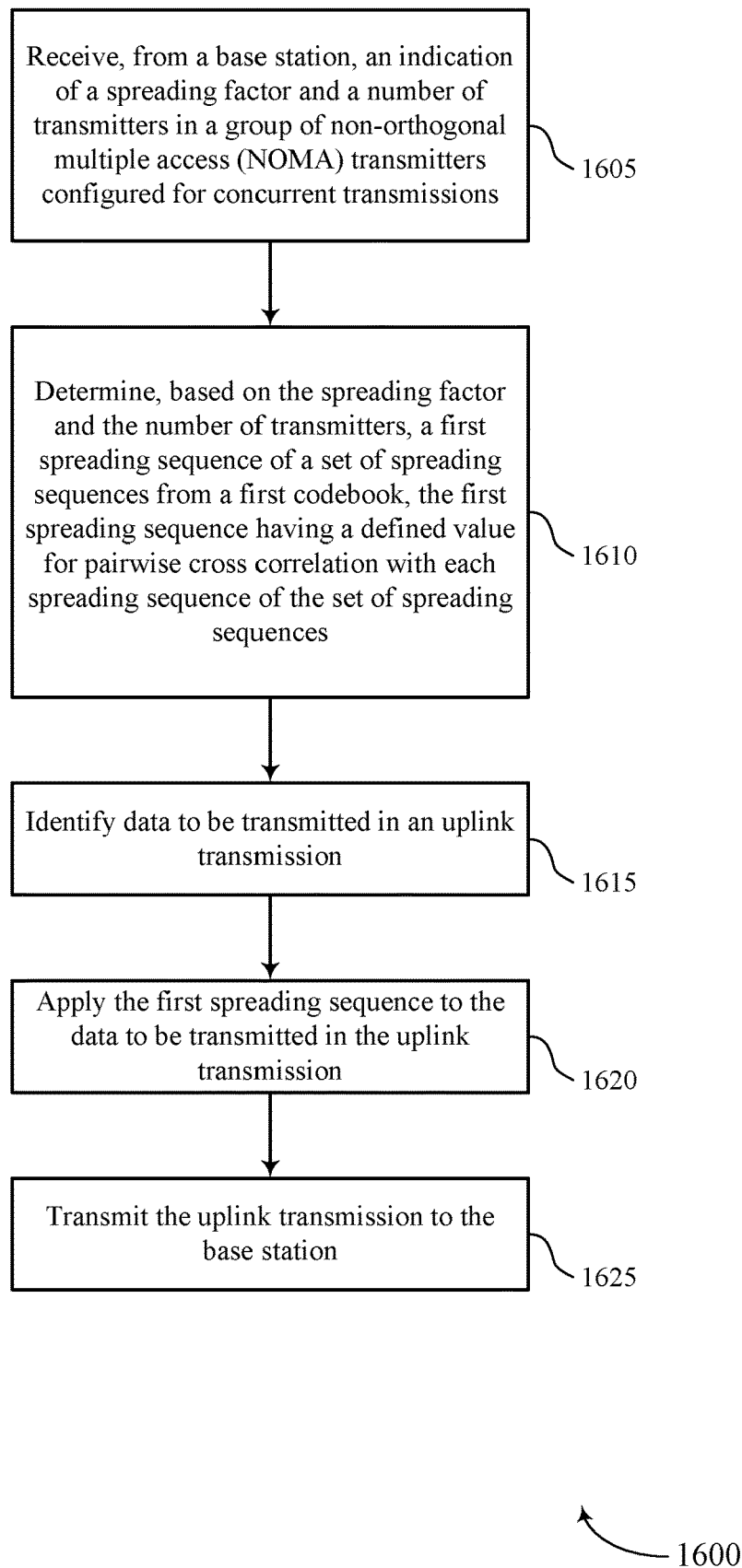
FIGS. 16 through 19 illustrate methods for pairwise cross correlation sequences for non-orthogonal multiple access wireless communications in accordance with aspects of the present disclosure.

FIG. 16 shows a flowchart illustrating a method 1600 for pairwise cross correlation sequences for non-orthogonal multiple access wireless communications in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station, an indication of a spreading factor and a number of transmitters in a group of NOMA transmitters configured for concurrent transmissions. The operations of 1605 may be performed according to the methods described herein. In certain examples, aspects of the operations of 1605 may be performed by an indication component as described with reference to FIGS. 8 through 11.

At 1610 the UE 115 may determine, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences. The operations of 1610 may be performed according to the methods described herein. In certain examples, aspects of the operations of 1610 may be performed by a spreading sequence component as described with reference to FIGS. 8 through 11.

At 1615 the UE 115 may identify data to be transmitted in an uplink transmission. The operations of 1615 may be performed according to the methods described herein. In certain examples, aspects of the operations of 1615 may be performed by a data component as described with reference to FIGS. 8 through 11.

At 1620 the UE 115 may apply the first spreading sequence to the data to be transmitted in the uplink transmission. The operations of 1620 may be performed according to the methods described herein. In certain examples, aspects of the operations of 1620 may be performed by a spreading sequence component as described with reference to FIGS. 8 through 11.

At 1625 the UE 115 may transmit the uplink transmission to the base station. The operations of 1625 may be performed according to the methods described herein. In certain examples, aspects of the operations of 1625 may be performed by a waveform generator as described with reference to FIGS. 8 through 11.

Figure 17:
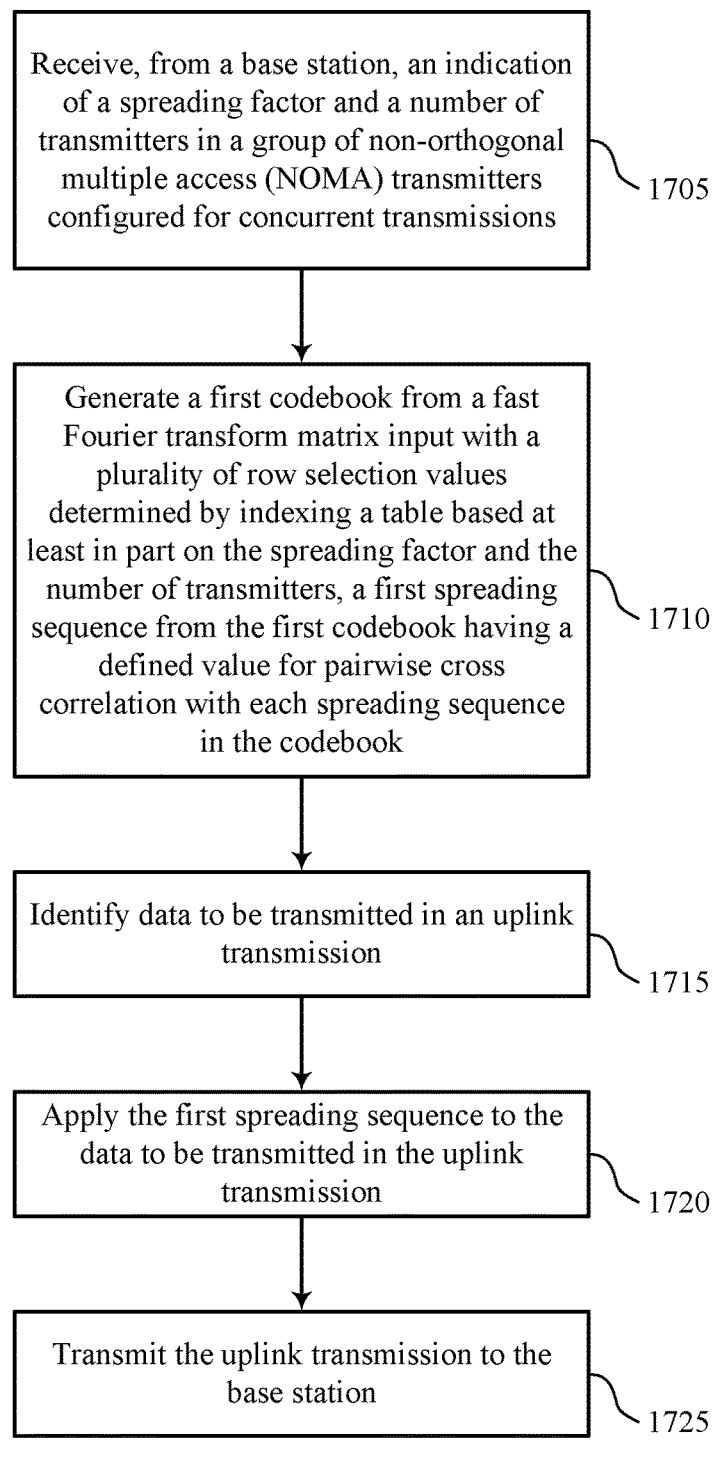

FIG. 17 shows a flowchart illustrating a method 1700 for pairwise cross correlation sequences for non-orthogonal multiple access wireless communications in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, from a base station, an indication of a spreading factor and a number of transmitters in a group of NOMA transmitters configured for concurrent transmissions. The operations of 1705 may be performed according to the methods described herein. In certain examples, aspects of the operations of 1705 may be performed by an indication component as described with reference to FIGS. 8 through 11.

At 1710 the UE 115 may determine, based at least in part on the spreading factor and the number of transmitters, a first spreading sequence of a plurality of spreading sequences from a first codebook, the first spreading sequence having a defined value for pairwise cross correlation with each spreading sequence of the plurality of spreading sequences. In some cases, determining the first spreading sequence further includes: indexing a table based at least in part on the spreading factor and the number of transmitters to determine a plurality of row selection values, and generating the first codebook from a fast Fourier transform matrix based at least in part on the plurality of row selection values, where the first spreading sequence corresponds to a column in the first codebook. The operations of 1710 may be performed according to the methods described herein. In certain examples, aspects of the operations of 1710 may be performed by a spreading sequence component as described with reference to FIGS. 8 through 11.

At 1715 the UE 115 may identify data to be transmitted in an uplink transmission. The operations of 1715 may be performed according to the methods described herein. In certain examples, aspects of the operations of 1715 may be performed by a data component as described with reference to FIGS. 8 through 11.

At 1720 the UE 115 may apply the first spreading sequence to the data to be transmitted in the uplink transmission. The operations of 1720 may be performed according to the methods described herein. In certain examples, aspects of the operations of 1720 may be performed by a spreading sequence component as described with reference to FIGS. 8 through 11.

At 1725 the UE 115 may transmit the uplink transmission to the base station. The operations of 1725 may be performed according to the methods described herein. In certain examples, aspects of the operations of 1725 may be performed by a waveform generator as described with reference to FIGS. 8 through 11.

Figure 18:
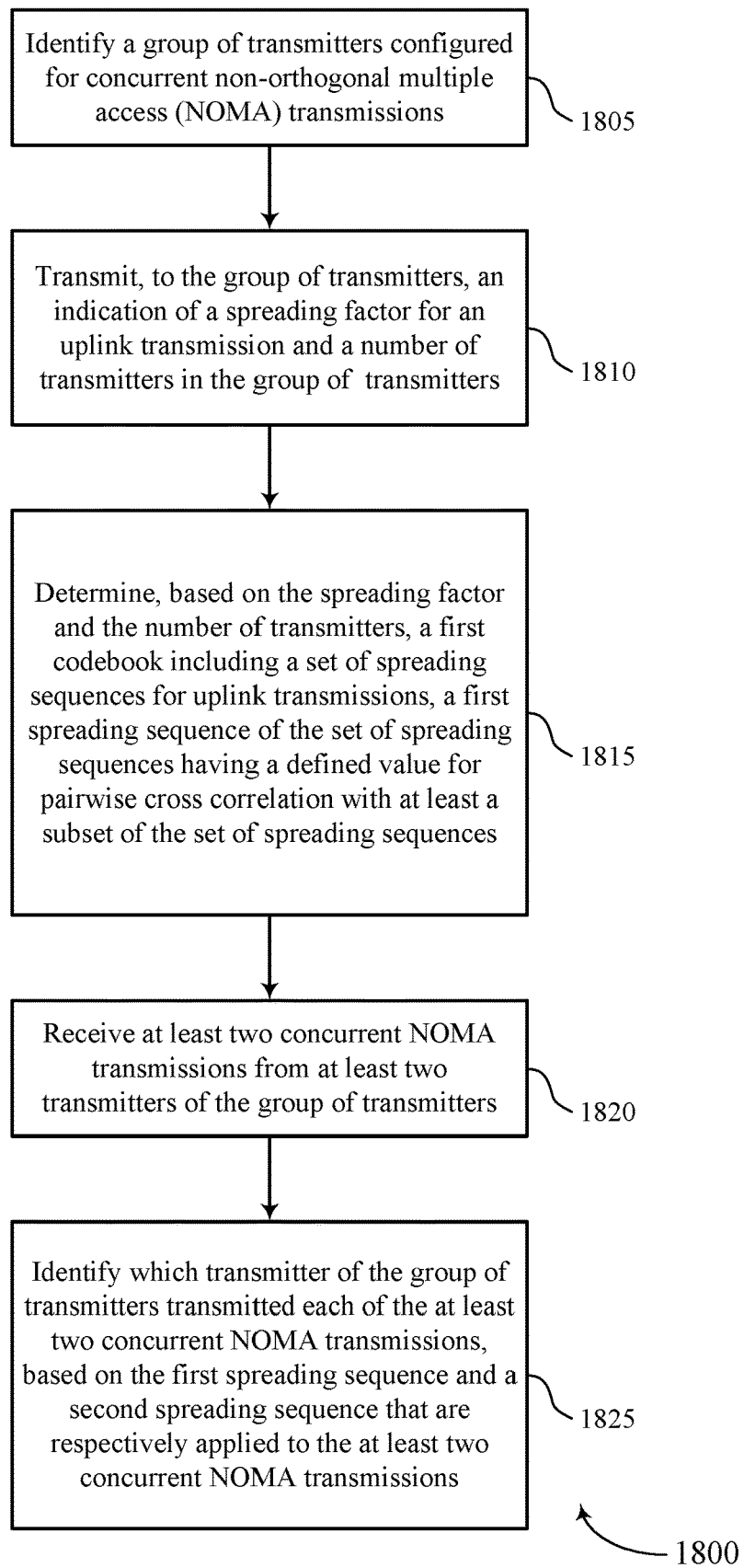

FIG. 18 shows a flowchart illustrating a method 1800 for pairwise cross correlation sequences for non-orthogonal multiple access wireless communications in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify a group of transmitters configured for concurrent NOMA transmissions. The operations of 1805 may be performed according to the methods described herein. In certain examples, aspects of the operations of 1805 may be performed by a group determiner component as described with reference to FIGS. 12 through 15.

At 1810 the base station 105 may transmit, to the group of transmitters, an indication of a spreading factor for an uplink transmission and a number of transmitters in the group of transmitters. The operations of 1810 may be performed according to the methods described herein. In certain examples, aspects of the operations of 1810 may be performed by an indicator component as described with reference to FIGS. 12 through 15.

At 1815 the base station 105 may determine, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences. The operations of 1815 may be performed according to the methods described herein. In certain examples, aspects of the opera-tions of 1815 may be performed by a spreading sequence component as described with reference to FIGS. 12 through 15.

At 1820 the base station 105 may receive at least two concurrent NOMA transmissions from at least two transmitters of the group of transmitters. The operations of 1820 may be performed according to the methods described herein. In certain examples, aspects of the operations of 1820 may be performed by a NOMA transmission component as described with reference to FIGS. 12 through 15.

At 1825 the base station 105 may identify which transmitter of the group of transmitters transmitted each of the at least two concurrent NOMA transmissions, based at least in part on the first spreading sequence and a second spreading sequence that are respectively applied to the at least two concurrent NOMA transmissions. The operations of 1825 may be performed according to the methods described herein. In certain examples, aspects of the operations of 1825 may be performed by an identifier component as described with reference to FIGS. 12 through 15.

Figure 19:
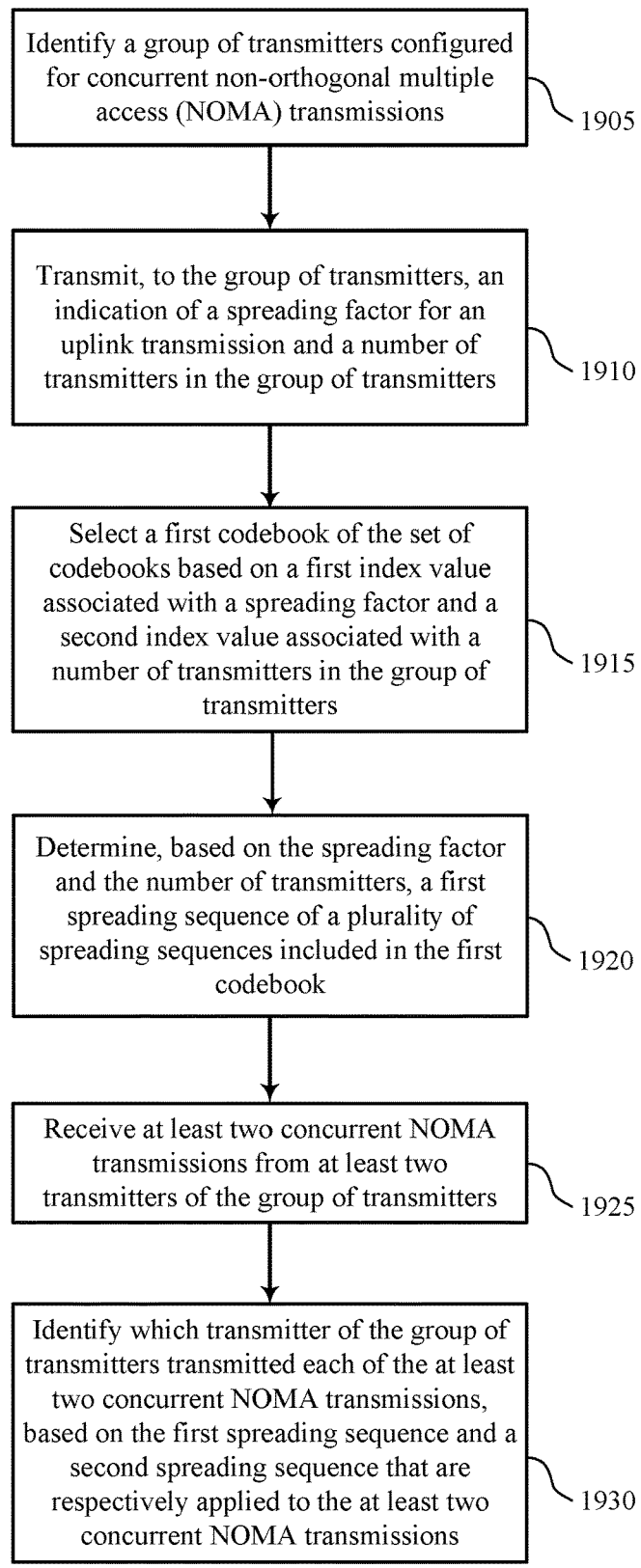

FIG. 19 shows a flowchart illustrating a method 1900 for pairwise cross correlation sequences for non-orthogonal multiple access wireless communications in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify a group of transmitters configured for concurrent NOMA transmissions. The operations of 1905 may be performed according to the methods described herein. In certain examples, aspects of the operations of 1905 may be performed by a group determiner component as described with reference to FIGS. 12 through 15.

At 1910 the base station 105 may transmit, to the group of transmitters, an indication of a spreading factor for an uplink transmission and a number of transmitters in the group of transmitters. The operations of 1910 may be performed according to the methods described herein. In certain examples, aspects of the operations of 1910 may be performed by an indicator component as described with reference to FIGS. 12 through 15.

At 1915 the base station 105 may select the first codebook of the plurality of codebooks based at least in part on a first index value associated with the spreading factor and a second index value associated with the number of transmitters in the group of transmitters. The operations of 1915 may be performed according to the methods described herein. In certain examples, aspects of the operations of 1915 may be performed by a codebook selector as described with reference to FIGS. 12 through 15.

At 1920 the base station 105 may determine, based at least in part on the spreading factor and the number of transmitters, a spreading sequence of a plurality of spreading sequences included in the first codebook. The first spreading sequence may have a defined value for pairwise cross correlation with at least a subset of the plurality of spreading sequences. The operations of 1920 may be performed according to the methods described herein. In certain examples, aspects of the operations of 1920 may be performed by a spreading sequence component as described with reference to FIGS. 12 through 15.

At 1925 the base station 105 may receive at least two concurrent NOMA transmissions from at least two transmitters of the group of transmitters. The operations of 1920 may be performed according to the methods described herein. In certain examples, aspects of the operations of 1925 may be performed by a NOMA transmission component as described with reference to FIGS. 12 through 15.

At 1930 the base station 105 may identify which transmitter of the group of transmitters transmitted each of the at least two concurrent NOMA transmissions, based at least in part on the first spreading sequence and a second spreading sequence that are respectively applied to the at least two concurrent NOMA transmissions. The operations of 1930 may be performed according to the methods described herein. In certain examples, aspects of the operations of 1930 may be performed by an identifier component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a transmitter, comprising:
   identifying a plurality of codebooks that each include a plurality of spreading sequences;
   receiving, from a base station, an indication of a spreading factor and a number of transmitters in a group of non-orthogonal multiple access (NOMA) transmitters configured for concurrent transmissions;
   selecting a first codebook from the plurality of codebooks based at least in part on the indication including a first index value associated with the spreading factor and a second index value associated with the number of transmitters in the group of NOMA transmitters;
   determining, based at least in part on the spreading factor and the number of transmitters, a first spreading sequence of the plurality of spreading sequences from the first codebook, the first spreading sequence having a defined value for pairwise cross correlation with each spreading sequence of the plurality of spreading sequences;
   identifying data to be transmitted in an uplink transmission;
   applying the first spreading sequence to the data to be transmitted in the uplink transmission; and
   transmitting the uplink transmission to the base station.

2. The method of claim 1, wherein determining the first spreading sequence further comprises:
   indexing a table based at least in part on the spreading factor and the number of transmitters to determine a plurality of row selection values; and
   generating the first codebook from a spreading sequence matrix based at least in part on the plurality of row selection values, wherein the first spreading sequence corresponds to a column in the first codebook.

3. The method of claim 2, wherein the spreading sequence matrix is a fast Fourier transform matrix.

4. The method of claim 1, wherein a plurality of spreading sequences of a second codebook of the plurality of codebooks are generated as a function of a total squared sum of cross correlation for spreading sequence pairs from the plurality of spreading sequences of the second codebook.

5. The method of claim 1, further comprising:
   channel coding the data to be transmitted to generate channel coded data; and
   modulating the channel coded data to generate a series of modulation symbols.

6. The method of claim 5, wherein the first spreading sequence is applied to each modulation symbol of the series of modulation symbols.

7. The method of claim 6, further comprising:
   mapping the spread series of modulation symbols to resources allocated for the concurrent transmissions, wherein the resources include frequency resources, time resources, spatial resources, or any combination thereof.

8. The method of claim 1, wherein the number of transmitters corresponds to a number of resource spread multiple access (RSMA) layers.

9. The method of claim 1, wherein each spreading sequence of the plurality of spreading sequences is a truncated Chu sequence.

10. The method of claim 1, wherein the defined value is a constant cross correlation value.

11. The method of claim 1, wherein the indication is received from the base station in downlink control information (DCI), a master information block (MIB), in a system information block (SIB), in remaining minimum system information (RMSI), or any combination thereof.

12. A method for wireless communication by a base station, comprising:
identifying a group of transmitters configured for concurrent non-orthogonal multiple access (NOMA) transmissions;
transmitting, to the group of transmitters, an indication of a spreading factor for an uplink transmission and a number of transmitters in the group of transmitters;
determining, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences;
receiving at least two concurrent NOMA transmissions from at least two transmitters of the group of transmitters; and
identifying which transmitter of the group of transmitters transmitted each of the at least two concurrent NOMA transmissions, based at least in part on the first spreading sequence and a second spreading sequence that are respectively applied to the at least two concurrent NOMA transmissions.

13. The method of claim 12, wherein determining the first codebook comprises:
indexing a table based at least in part on the spreading factor and the number of transmitters to determine a plurality of row selection values; and
generating the first codebook from a spreading sequence matrix based at least in part on the plurality of row selection values, wherein the first spreading sequence corresponds to a column in the first codebook.

14. The method of claim 13, wherein the spreading sequence matrix is a fast Fourier transform matrix.

15. The method of claim 12, wherein determining the first codebook comprises:
identifying a plurality of codebooks that each include a plurality of spreading sequences, the plurality of codebooks including the first codebook; and
selecting the first codebook of the plurality of codebooks based at least in part on a first index value associated with the spreading factor and a second index value associated with the number of transmitters in the group of transmitters.

16. The method of claim 15, wherein a plurality of spreading sequences of a second codebook of the plurality of codebooks are generated as a function of a total squared sum of cross correlation for spreading sequence pairs from the plurality of spreading sequences of the second codebook.

17. The method of claim 12, wherein receiving the at least two concurrent NOMA transmissions further comprises:
demapping the at least two concurrent NOMA transmissions to generate a despreaded set of modulation symbols; and
combining the despreaded set of modulation symbols based at least in part on the plurality of spreading sequences in the first codebook.

18. The method of claim 17, wherein receiving the at least two concurrent NOMA transmissions further comprises:
demodulating and decoding the despreaded set of modulation symbols.

19. The method of claim 18, further comprising:
determining a spreading sequence applied to each spread set of modulation symbols; and
identifying which transmitter of the group of transmitters transmitted each received transmission based at least in part on the determined spreading sequence.

20. The method of claim 12, wherein a configuration and size of the first codebook, and a spreading scheme is transmitted in downlink control information (DCI), in a master information block (MIB), in a system information block (SIB), in remaining minimum system information (RMSI), in a payload of a group common physical downlink control channel (PDCCH) transmission, or any combination thereof.

21. The method of claim 12, wherein the number of transmitters corresponds to a number of resource spread multiple access (RSMA) layers.

22. The method of claim 12, wherein each spreading sequence in the plurality of spreading sequences is a truncated Chu sequence.

23. The method of claim 12, wherein the defined value is a constant cross correlation value.

24. An apparatus for wireless communication by a transmitter, comprising:
a processor;
memory in electronic communication with the processor; and
instructions stored in the memory and executable by the processor to cause the apparatus to:
identify a plurality of codebooks that each include a plurality of spreading sequences;
receive, from a base station, an indication of a spreading factor and a number of transmitters in a group of non-orthogonal multiple access (NOMA) transmitters configured for concurrent transmissions;
select a first codebook from the plurality of codebooks based at least in part on the indication including a first index value associated with the spreading factor and a second index value associated with the number of transmitters in the group of NOMA transmitters;
determine, based at least in part on the spreading factor and the number of transmitters, a first spreading sequence of the plurality of spreading sequences from the first codebook, the first spreading sequence having a defined value for pairwise cross correlation with each spreading sequence of the plurality of spreading sequences;
identify data to be transmitted in an uplink transmission;
apply the first spreading sequence to the data to be transmitted in the uplink transmission; and
transmit the uplink transmission to the base station.

25. The apparatus of claim 24, wherein the instructions to determine the first spreading sequence further are executable by the processor to cause the apparatus to:
index a table based at least in part on the spreading factor and the number of transmitters to determine a plurality of row selection values; and
generate the first codebook from a spreading sequence matrix based at least in part on the plurality of row selection values, wherein the first spreading sequence corresponds to a column in the first codebook.

26. The apparatus of claim 25, wherein the spreading sequence matrix is a fast Fourier transform matrix.

27. The apparatus of claim 24, wherein a plurality of spreading sequences of a second codebook of the plurality of codebooks are generated as a function of a total squared sum of cross correlation for spreading sequence pairs from the plurality of spreading sequences of the second codebook.

28. An apparatus for wireless communication by a base station, comprising:
- a processor;
- memory in electronic communication with the processor; and
- instructions stored in the memory and executable by the processor to cause the apparatus to:
  - identify a group of transmitters configured for concurrent non-orthogonal multiple access (NOMA) transmissions;
  - transmit, to the group of transmitters, an indication of a spreading factor for an uplink transmission and a number of transmitters in the group of transmitters;
  - determine, based at least in part on the spreading factor and the number of transmitters, a first codebook including a plurality of spreading sequences for uplink transmissions, a first spreading sequence of the plurality of spreading sequences having a defined value for pairwise cross correlation with at least a subset of the plurality of spreading sequences;
  - receive at least two concurrent NOMA transmissions from at least two transmitters of the group of transmitters; and
  - identify which transmitter of the group of transmitters transmitted each of the at least two concurrent NOMA transmissions, based at least in part on the first spreading sequence and a second spreading sequence that are respectively applied to the at least two concurrent NOMA transmissions.

* * * * *